US012016098B1

(12) United States Patent
Sieracki et al.

(10) Patent No.: US 12,016,098 B1
(45) Date of Patent: Jun. 18, 2024

(54) SYSTEM AND METHOD FOR USER PRESENCE DETECTION BASED ON AUDIO EVENTS

(71) Applicant: REALITY ANALYTICS, INC., Columbia, MD (US)

(72) Inventors: Jeffrey Sieracki, Silver Spring, MD (US); Xavier Gutierrez, Elkridge, MD (US)

(73) Assignee: Renesas Electronics America, San Jose, CA (US)

( * ) Notice: Subject to any disclaimer, the term of this patent is extended or adjusted under 35 U.S.C. 154(b) by 817 days.

(21) Appl. No.: 17/020,290

(22) Filed: Sep. 14, 2020

Related U.S. Application Data

(60) Provisional application No. 62/899,356, filed on Sep. 12, 2019.

(51) Int. Cl.
H05B 47/12 (2020.01)
G05B 19/048 (2006.01)
G08B 13/16 (2006.01)
G10L 25/03 (2013.01)
G10L 25/51 (2013.01)

(52) U.S. Cl.
CPC ........... H05B 47/12 (2020.01); G05B 19/048 (2013.01); G08B 13/1672 (2013.01); G10L 25/03 (2013.01); G10L 25/51 (2013.01); G05B 2219/2642 (2013.01)

(58) Field of Classification Search
CPC .................. H05B 47/12; G05B 19/048; G05B 2219/2642; G08B 13/1672; G10L 25/03; G10L 25/51
See application file for complete search history.

(56) References Cited

U.S. PATENT DOCUMENTS

| 5,991,277 | A | 11/1999 | Maeng et al. |
| 6,205,422 | B1 | 3/2001 | Gu et al. |
| 6,826,528 | B1 | 11/2004 | Wu et al. |
| 7,517,328 | B2 * | 4/2009 | Hoffmann ............... A61H 31/00 601/48 |
| 8,195,598 | B2 | 6/2012 | Hua et al. |
| 8,311,821 | B2 | 11/2012 | Breebaart et al. |
| 9,177,559 | B2 | 11/2015 | Stephenson et al. |
| 9,215,538 | B2 | 12/2015 | Rauhala |
| 9,633,654 | B2 | 4/2017 | Raychowdhury et al. |

(Continued)

Primary Examiner — Tung S Lau
(74) Attorney, Agent, or Firm — Rosenberg, Klein & Lee

(57) ABSTRACT

A system and method are provided for detecting the presence of animate users, such as people, within a monitored environment, based on audio events. A transducer captures sound signals generated within the monitored environment, which a capture channel converts to form a digital stream. A feature extractor detects predetermined signal features of the digital stream over predetermined extraction periods, and an event classifier uses values of these features to generate a series of detection events reflective of likely sources of sounds in the captured sound signals. Then, an event buffer maintains an aggregate count of detection events generated by the event classifier, and a status generator generates the user presence indicator according to the aggregate count of detection events. A response system triggers one of more functions responsive to one or user presence indicators, thereby responding to the presence or absence of the animate users.

14 Claims, 15 Drawing Sheets

(56) References Cited

U.S. PATENT DOCUMENTS

| | | | |
|---|---|---|---|
| 9,939,823 B2 | 4/2018 | Ovadia | |
| 10,082,574 B2 | 9/2018 | Wouhaybi et al. | |
| 10,121,494 B1 | 11/2018 | Sundaram et al. | |
| 10,515,654 B2 | 12/2019 | Nongpiur | |
| 2013/0282379 A1* | 10/2013 | Stephenson | G10L 17/26 704/270 |

* cited by examiner

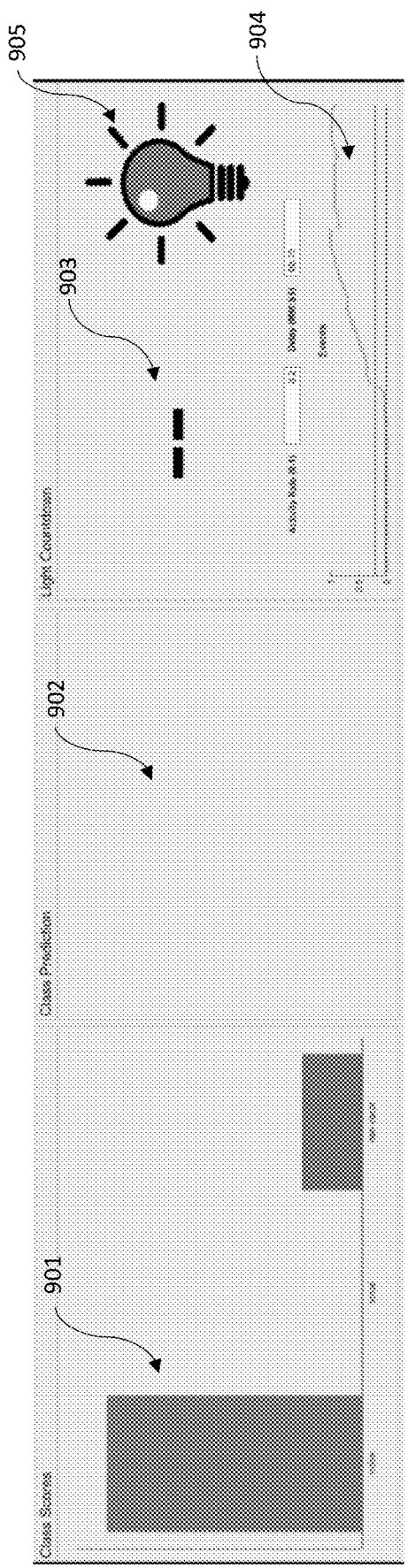
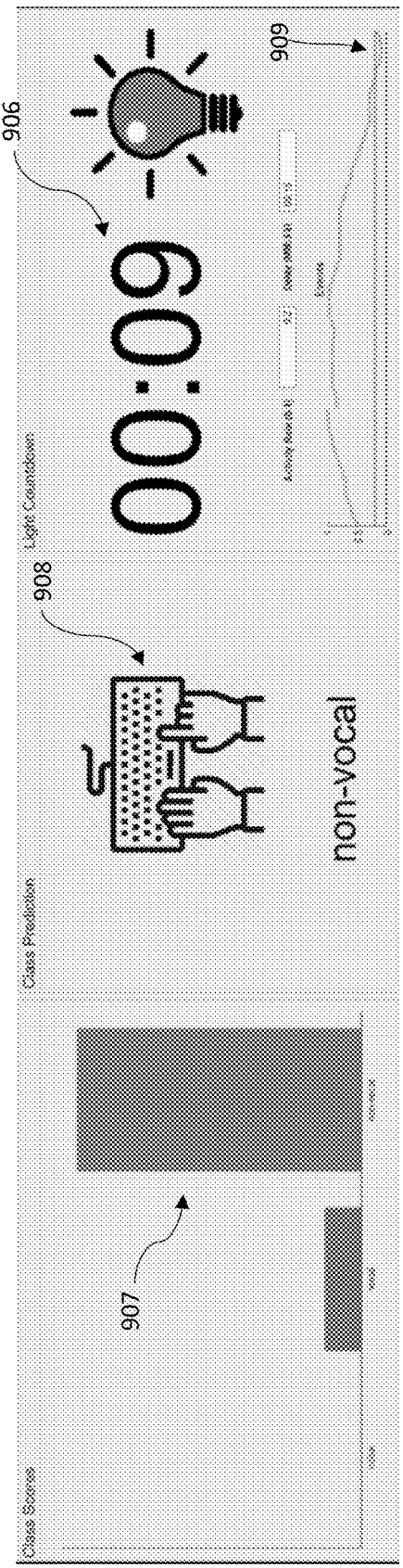
FIG. 9A
FIG. 9B

SYSTEM AND METHOD FOR USER PRESENCE DETECTION BASED ON AUDIO EVENTS

RELATED PATENTS AND APPLICATIONS

This application is based on U.S. Provisional Patent Application No. 62/899,356, filed on Sep. 12, 2020. The contents of this application are incorporated herein by reference.

BACKGROUND OF THE INVENTION

The subject system and method are generally directed to a system and method for detection of user presence or absence based on audio events, for triggering responsive action thereto. The system and method generally provide for an accurate detection which distinguishes user-generated audio events from non-user events, and adapts for false negatives and false positives through consideration of such factors as the rate of detected events over a relatively extended period.

In recent years, various systems have been designed to activate certain system features upon entry of someone (a "user") into an environment, and to keep these features active while the user is present, then deactivate them upon the departure of the user. Such systems conserve electricity, processing power, and other resources by keeping these features inactive when no actual person is present to make use of them. The benefits to security and alarm systems detecting someone's presence are also clear.

It is preferred that any such system include an accurate means of determining when a person is present, with low rates of both false positives and false negatives. A system which incorrectly determines a person to be present will fail to conserve the resources as desired. A system which incorrectly determines no person to be present will not have the features active when the person needs them.

SUMMARY OF THE INVENTION

It is an object of the disclosed system and method to detect the presence of a user from the audible activity thereof, including both vocal and "incidental" sounds.

It is another object of the disclosed system and method to more accurately recognize a user's presence, including during periods of minimal activity, so as to reduce "false negatives," yet also to distinguish non-user activity so as to reduce "false positives."

It is yet another object of the disclosed system and method to provide numerous features for fine-tuning to the expected sounds and expected users in a particular environment.

It is still another object of the disclosed system and method to provide information about user presence to various systems which provide appropriate responses, either upon entrance and exit or throughout the duration of the user's presence.

These and other objects may be attained in a system and method for user presence detection based on audio events. In accordance with certain embodiments of the present invention, a system is provided for detecting the presence of animate users within a monitored environment. The system includes at least one transducer configured to capture sound signals generated within the monitored environment. The system also includes a capture channel coupled to the transducer. The capture channel receives and converts the signals captured by the transducer to form a digital stream.

The system also includes a processor configured to generate a user presence indicator for the monitored environment. The processor includes a feature extractor executing on the processor to detect at least one predetermined signal feature of the digital stream over a predetermined extraction period. The processor also includes at least one event classifier executing on the processor to generate a series of detection events responsive to the predetermined signal features of the predetermined extraction period. The processor also includes at least one event buffer having a predetermined event buffer length defining a buffer period. The event buffer executes on the processor to maintain an aggregate count of detection events generated by the event classifier. The processor also includes a status generator executing on the processor to generate the user presence indicator according to the aggregate count of detection events. The user presence indicator is provided for triggering one or more functions of a response system.

Additional aspects, details, and advantages of the disclosed system and method will be set forth, in part, in the description and figures which follow.

BRIEF DESCRIPTION OF THE DRAWINGS

FIGS. 8A, 8B, 9A, 9B, and 10 are depictions of elements of the GUI illustrated in FIG. 7, displaying information in response to the example audio sequence illustrated in FIG. 6, in accordance with an exemplary embodiment of the present invention;

DETAILED DESCRIPTION OF THE PREFERRED EMBODIMENTS

Figure 1:
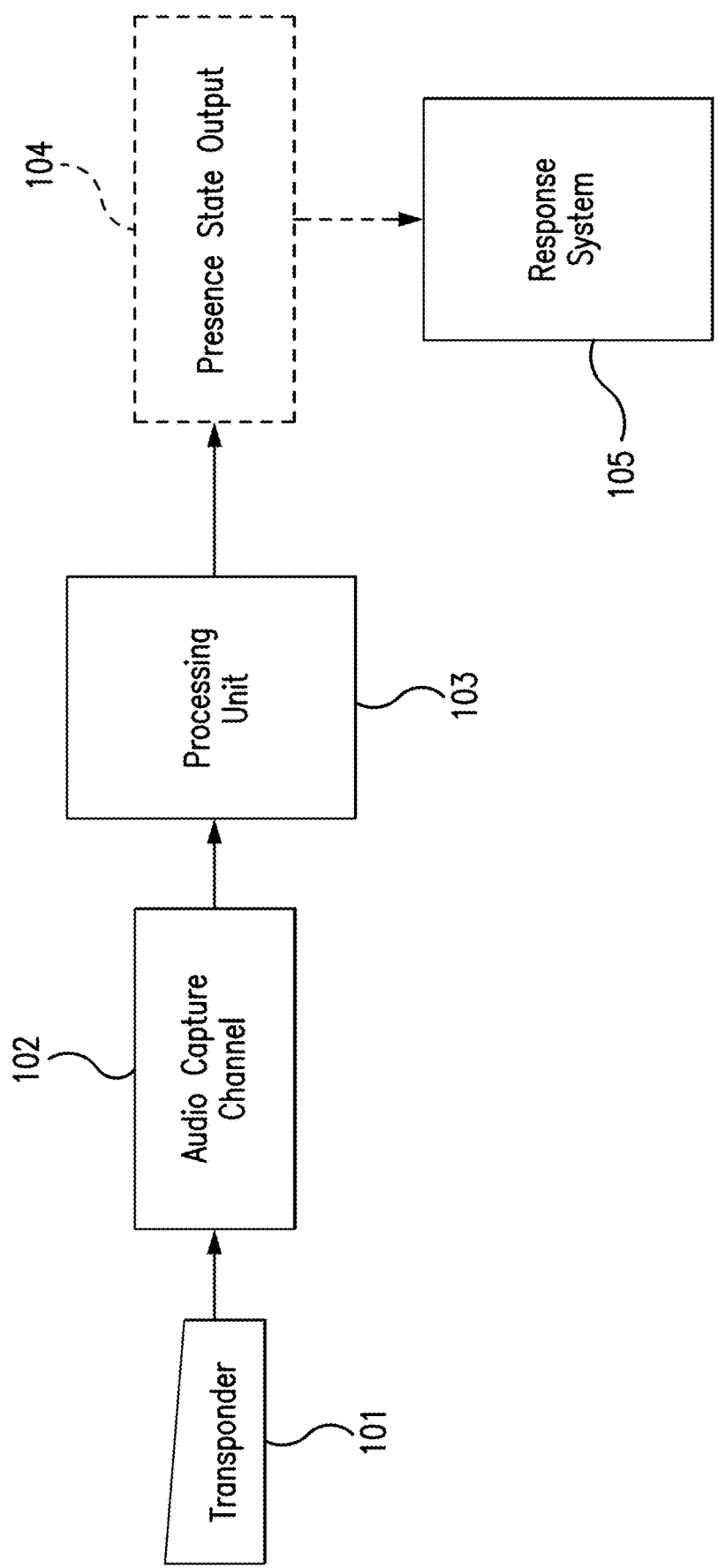
FIG. 1 is a block diagram illustrating a system for detecting the presence of users in an environment, in accordance with an exemplary embodiment of the present invention.

Reference will now be made in detail to exemplary embodiments, which are illustrated in the accompanying drawings, wherein like reference numerals refer to the like elements throughout. The embodiments are described below in order to explain the disclosed system and method with reference to the figures illustratively shown in the drawings for certain exemplary embodiments for sample applications.

As stated in the Background, it is useful for certain types of systems to activate and maintain certain functions while one or more people are present. For ease of description, these functions will be referred to generally as the "triggered functions" going forward, and an existing system which executes one or more triggered functions will be referred to generally as the "response system." As but one example, a response system may be a lighting system, and the triggered functions can be the active ("on") and inactive ("off") states for one or more lights in the lighting system. The lighting system may automatically light a room when someone is present and then turn off when no one is present. Although the invention may also be used in other response systems known to one of skill in the art, and for other triggered functions, a lighting system is generally referred to in certain places in the disclosure for convenience of description. This is for illustrative purposes, as the subject system and method may be suitably implemented in other types of systems and need not be limited thereto.

These systems can in various applications be implemented to detect any animate being relevant to operation of the triggered functions. For convenience and brevity, such beings are generally referred to herein as "users" and/or "occupants." Animate beings include human beings, or people/persons, and human users are generally referred to in certain places in the disclosure for convenience of description. This is for illustrative purposes, as the subject system and method may be suitably implemented for non-human users and need not necessarily be limited thereto.

General approaches for detecting a person within an environment include the use of passive infrared, ultrasonic, radar, and optical sensors. Each of these is dependent on the motion of the person, such that a person holding sufficiently still will no longer be detected. This can be problematic in a large environment, as the size of a detectable motion will be proportional to the distance from the nearest sensor. This is also particularly problematic in environments where a person can be expected to be still for an extended period, such as in a bathroom, or while watching entertainment.

Another general approach is the use of acoustic detectors. In some known systems, a user specifically audiblizes a "wake word" or trigger phrase to activate a function. This requires a deliberate action and is not particularly useful where passive monitoring is preferred. This approach is also not particularly useful if the function is designed to auto-reset to save resources, since for continuous operation the user must repeat the phrase on a regular basis to keep the triggered function active.

In other known systems, acoustic detectors use any audio as a trigger. Users or other animate occupants are not generally capable of remaining perfectly noiseless, and therefore, for a sufficiently sensitive system, the sound of regular movement of an occupant in these cases will keep the function active. However, such a sensitive system can also easily be activated by sounds which have no connection to human activity in the environment—for example, other devices such as air conditioning or appliances, the activity of pets, loud vehicles immediately outside, or even non-existence "noise" which is generated during or after capture due to defects in the components of the system. Such "false positives" can be averted by setting a higher threshold for activation (effectively reducing the sensitivity), but this in turn results in increased "false negatives" of the same sort encountered with non-acoustic detection systems, where a relatively silent and motionless person may not be detected.

Briefly, a system and method realized in accordance with certain aspects of the present invention provide for differentiating between user-generated or occupant-generated sound and other forms of sound, and properly identifying the presence of a person based upon the occurrence of the former while safely ignoring the latter. The system and method in certain illustrative embodiments make use of aggregate counts representing human-generated noise detected during a buffer period to determine whether or not a person is likely to be present in a given moment. By regularly generating status values based on these aggregate counts, the system and method can provide direction on whether to actuate functions which respond to the presence or absence of people.

In a preferred embodiment, "human noise" broadly encompasses speech, non-speech vocal sounds (for example, coughs, grunts, sighs, breathing, and interjections such as "hmm"), and non-vocal sounds of human activity (for example, finger tapping, footfalls, and chair and door motions).

For non-vocal human activity, the system can be specialized to the environment in consideration of what activity might be expected. For example, in an office environment, typing, mouse clicks, and paper rustling might be included; while in a kitchen environment, the system might consider the clinking of spoons in pots and pans, or the sound of particular appliances such as toasters and stovetops which are not generally left running in a person's absence. Such specialization is in some embodiments deliberately configured by a person through settings. In other embodiments it is the result of machine learning of a suitable type known in the art, configured through sufficient operation in the desired environment, which will come to identify key sounds that are most likely to correspond to human activity in that environment.

Of the three categories of human noise, speech is more likely to be correctly identified, while non-vocal human activity is more likely to be incorrectly identified. As such, in a preferred embodiment, appropriate computational weights are applied to a positive detection event in each category of human noise, with for example speech events given the greatest weight and non-vocal events given the least weight. In at least some embodiments, different types of non-vocal events are individually weighted differently, preferably according at least in part to their specific false positive rate. The false positive rates and corresponding weights can, again, be specialized to the environment through either deliberate configuration or machine learning.

The use of acoustic signals as one detection means does not rule out combination with other detection means also described above. For example, in one embodiment, the acoustic detection is combined with passive infrared detection, thus detecting both sound and motion. Mindful of this context, the disclosure that follows will focus on improved identification of noise generated by people, as part of a system which detects the presence or absence of people.

FIG. 1 depicts a detection system for detecting the presence of humans in an environment, according to an exemplary embodiment of the invention.

In the depicted embodiment, a physical sounds transducer 101, such as a microphone, contact microphone, accelerometer, piezo device, or any other means to capture vibration or sound energy from the room, provides input. In some embodiments more than one microphone may be connected as input. These may be configured to selectively be used, to be tested sequentially by the system, to be tested individually by the system with results of detections (later discussed) combined, or used jointly in beam forming to find each source sound and produce a final signal channel with directional information, among others. In that last configuration, though not illustrated in the present figures, it becomes possible to use the directional information to further guide decisions about the correlation with detected sounds and activity of a human located within the room. Without loss of generality, herein the word "microphone" will be used to describe any suitable transducer, and the word "sound" to describe any set of vibrations detected as a signal, regardless of the frequency ranges involved and the nature of the transducer.

In the basic configuration discussed, without loss of generality, we assume the microphone sound data is reduced to a single channel for further processing in this example. The microphone 101 is coupled to an audio capture channel 102, which in accordance with the type of input transducer, performs amplification, conditioning, and sampling or resampling of the sound input to produce a digital stream of audio data, which are individually known in the art and will not be detailed herein. Typically, this stream is produced at a fixed sample rate. 16 Khz (16,000 samples per second) is an example of an audio rate conducive to the present invention's function, but higher or lower sample rates can be used without significant change to the functions described herein and are within the scope of the invention.

Sound signal data is passed from the capture channel 102 into the processing system 103. Suitable processing systems include but are not limited to an embedded MPU, a microprocessor CPU, or other computing devices capable of being enabled to perform the operations described herein as software functions.

The output 104 of the presence determination is in certain embodiments simply an alarm provided to a user or a record stored to a log. However, preferably, the output 104 is further acted upon by another processing system 105. The further processing, in certain embodiments, is conducted on the same processing unit 103 in additional software functions, while in other embodiments it is instantiated in a separate system that receives an output from this invention and acts further upon it.

Figure 1A:
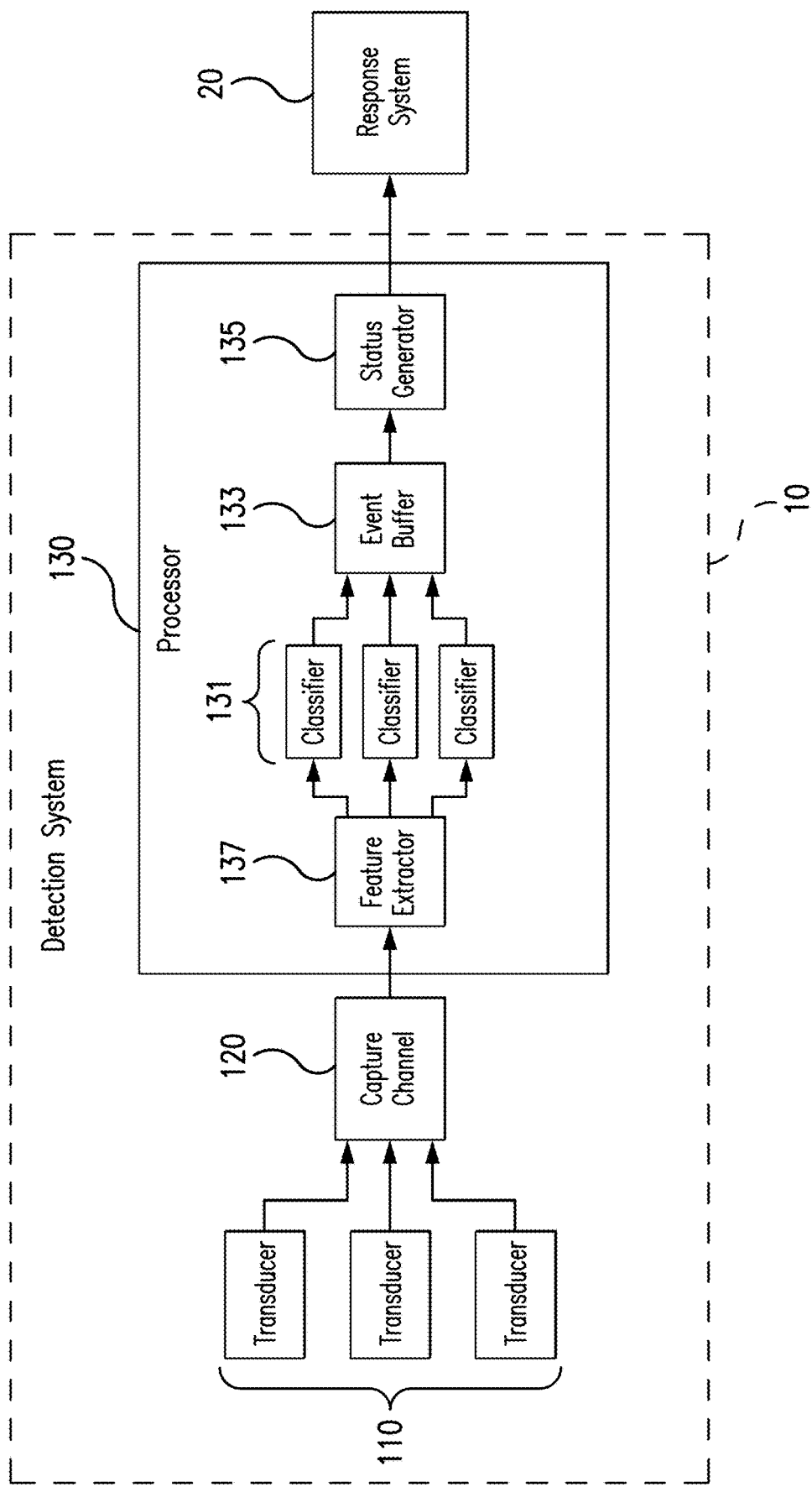
FIG. 1A is a block diagram illustrating another system for detecting the presence of users in an environment, in accordance with another exemplary embodiment of the present invention.

FIG. 1A depicts another detection system 10 for detecting the presence of humans in an environment, according to another exemplary embodiment of the invention. In the depicted embodiment, at least one transducer 110 is coupled to a processor 130 through an audio capture channel 120. The detection system 10 is coupled to a response system 20.

The transducer 110 is configured to capture sound and/or vibration signals, such as acoustic waves. Preferably, the transducer is formed by one or more suitable devices known in the art capable of capturing vibration energy, including but not limited to traditional and digital microphones, accelerometers, piezo devices, sonar receivers, and vibrational sensors. In some embodiments, the transducer or transducers also capture the direction of the energy. The transducer 110 is disposed in a surrounding environment, which is expected to episodically but not constantly contain users, such that the detection system 10 as a whole can monitor the environment for their presence. The monitored environment can be but is not limited to a room or set of rooms (including hallways), an entire building, a vehicle, or a local region of a defined outdoor space. A suitable number and distribution of transducers 110 are disposed based on the size of the monitored environment, the presence of any obstacles which might impede the flow of sound energy, and other factors.

The capture channel 120 is coupled to the transducer (or transducers) 110, and is configured to convert the captured signals received therefrom into a digital stream. Preferably but not necessarily, a single capture channel 120 is used regardless of the number of transducers 110, and the signals captured by the transducers are combined in the capture channel 120. The capture channel preferably performs a suitable combination of amplification, conditioning, sampling, and resampling as part of the conversion to digital format, which are individually known in the art and will not be detailed herein. Typically, this stream is produced at a fixed sample rate. 16 Khz (16,000 samples per second) is an example of an audio rate conducive to the present invention's function, but higher or lower sample rates can be used without significant change to the functions described herein and are within the scope of the invention. Additionally, certain embodiments may employ variable sample rates, for example in accordance with changing environmental requirements, or in accordance with certain parametric features of some microphone transducers (e.g. pulse-width modulation coding).

A plurality of microprocessing modules execute on the processor 130 to process the digital stream, or a buffer period thereof, generated by the capture channel 120. These modules include at least one event classifier 131, at least one event buffer 133, and a status generator 135.

Each event classifier 131 is configured to generate detection events based on analysis of the digital stream. Each detection event corresponds to a distinct sound (or other vibrational act) which was detected in the digital stream. The generated detection event includes data indicating the type of sound. For brevity, this type will be referred to as the type of the event going forward.

In some embodiments, such as in the depicted embodiment, a plurality of event classifiers 131 are implemented, and each event classifier 131 is configured to identify events of specific types in the transduced sounds. For example, one of the event classifiers might specifically identify whether a distinct sound is the movement of furniture, and another might specifically distinguish whether a sound is more like to be a footfall or a radiator ping. Event classifiers of both broader focus (for example, all non-vocal human activity) and narrower focus (for example, roller chair movement only) are also within the scope of the invention. Additionally, event classifiers may be "chained together" such that some analyze data only upon certain determinations by others.

The means by which an event classifier identifies the type of sound is not limited, as many suitable means for automatic categorization of vibrational and acoustic signals are known in the art. Indeed, in certain embodiments, not all of the event classifiers 131 use the same means. However, in a preferred embodiment, the event classifiers 131 consider the value or power of one or more signal features in a segment of the digital stream, which represents the signals captured within a predetermined length of time. Certain signal feature values, or combinations thereof, within this stream segment indicate to the event classifiers 131 that a specific type of sound has occurred. These features can include, but are not limited to root mean square (RMS) energy, crest factor, spectral shape, spectrogram and similar short window time analysis of spectral shape spaced over time, the periodicity of such spectrograms, filter banks, or sparse signal decompositions. Without limitation, spectral shape may be measured for example in some embodiments by a discrete Fourier transform, the log or power of such, or the same normalized by RMS energy of the window. It is noted that the window in this context need not be the entire stream segment; in certain embodiments the feature is determined for a plurality of windows, either discrete or overlapping, within the segment.

In certain embodiments, a separate feature extractor 137, also executing on the processor 130, measures the values of these features from the stream segment. Preferably, the feature extractor 137 generates a feature vector which includes these signal feature values, which is then analyzed by the event classifier 131. This approach is more efficient when a large number of event classifiers 131, all using the same information for classification, are included. The feature extractor 137 preferably does not consider the entire digital stream, but an "extraction buffer" or "extraction segment" thereof which contains the most recent portion of the stream. In various embodiments, either the capture channel 120 or the feature extractor 137 isolates and maintains this extraction segment.

The features and their values can be mapped into classifications by the event classifiers 131 using suitable techniques known in the art, including but not limited to support vector machines, logistics regression, random forests, neural networks, deep neural networks, binary neural networks, and even manual configuration. In a preferred embodiment, the sound events are classified according to type using, for example, acoustic signal discrimination measures disclosed in U.S. Pat. Nos. 7,079,986 and 8,271,200

The event buffer 133 maintains an aggregate count of detection events which correspond to a predetermined event buffer period having a predetermined length of time. The event buffer 133 thereby defines the event buffer period, and represents events detected in the signals captured within that period. In certain embodiments, each of a plurality of event buffers 133 maintains a count of closely related types. For example, in one example embodiment, three event buffers maintain an aggregate count of all speech sounds, all non-speech vocal sounds, and all non-vocal human sounds respectively detected within the event buffer period. However, in the depicted embodiment, a single event buffer 133 maintains an aggregate count of all events detected within the event buffer period which indicate human presence.

For convenience and brevity, use of but a single event buffer 133 will be assumed in certain illustrated cases going forward, with the understanding that embodiments with a plurality of event buffers remain within the scope of the invention. Such multi-event buffer embodiments may be extrapolated from the descriptions relating to a single event buffer embodiment.

As noted previously, in various embodiments, certain types of detection events are assigned different weights. In some embodiments, these weights are assigned at least in part according to the likelihood that a particular sound indicates the presence of a person in the environment. For example, if it is determined that sounds of footfalls are highly likely to indicate a human presence, "footfall" events can be weighted correspondingly high. Additionally, in some embodiments, these weights are assigned at least in part according to the accuracy of the classifier or classification for the type of event. For example, if a "footfall" classification is determined to be more likely than other types to be a false positive, "footfall" events can be weighted correspondingly low. Furthermore, in some embodiments, weights are individually assigned at the time each event is generated according to the accuracy of the particular classification. For example, if the event classifier determines only a 55% probability that a particular sound was a footfall (perhaps because the sound was faint, or had an unusual aspect to it not normally found in footfalls), that particular "footfall" event can be weighted lower than one with a 90% probability. Preferably, all such factors will be accounted for in the weighting of a given event. In a machine learning implementation, these weights can be automatically adjusted over time, using methods known in the art.

It is noted that certain detection events are effectively ignored at this stage by not including them in an aggregate count. For example, the sounds of an air conditioner running, automated building functions, or a lightning strike give no useful information as to whether or not a person is in the environment, and are preferably not tallied in any aggregate count, or are assigned a weight of "0" for the purposes of the count. Because these events are non-useful in the determination whether a human is present, some embodiments will not generate events of their type at all. However, other embodiments will employ suitable measures for filtering, screening, or otherwise identifying them, in order to distinguish them from other similar sounds which are more useful.

In embodiments with a single event buffer 133, weights are preferably applied to an event before it is added to the aggregate count. For example, if "moving furniture" is given a weight of 0.6, each detection event of the type "moving furniture" adds 0.6 to the aggregate count in the event buffer 133. In some but not all embodiments which have multiple event buffers 133, all events having a specific weight are added to the aggregate count in the same event buffer 133, and the entire aggregate count is weighted at the appropriate time. For example, if an event buffer with an aggregate count of 15 has an assigned weight of 0.6, its weighted aggregate count will be 10.

The status generator 135 generates a value for a user presence status parameter according to the aggregate count of the event buffer. The value is an indicator of whether one or more users are currently present (or in certain embodiments, how likely they are to be present) in the monitored environment.

For a properly configured set of event classifiers 131 and weights, it is possible for the status generator 135 to generate the status value based solely on whether the aggregate count (or sum of counts, for an embodiment with a plurality of event buffers), after weighting, exceeds a threshold value. However, in certain embodiments which employ a plurality of event buffers 133, separate thresholds are designated for the counts of each of the individual buffers, and the individual results are reconciled according to suitable logic in the status generator 135 when they do not agree.

In certain embodiments, the presence status parameter is a Boolean value—"present" or "not present." In other embodiments, the presence status parameter is a probability value. In the latter case, the response system preferably includes its own logic to determine at what probability (or series of probabilities) the triggered function should actuate or deactuate, according to the needs of the response system.

Using the system described above, the status value has "inertia." That is, the status generator 135 tends to maintain the current status value until the conditions not only change, but remain changed for a predetermined period. For example, if all signs of human activity cease, the event buffer will continue to contain the recent evidence of human activity according to the length of the event buffer. This built-in delay accounts for the possibility that a person has gone momentarily silent, and in effect reflects whether an average number of events over the predetermined period fall below a threshold.

This "inertia" is expanded upon in certain embodiments, where the present status value does not change until certain predefined rules are satisfied, such as the aggregate count of the event buffer remaining under a predetermined threshold for a lengthier period in certain circumstances. For example, in the case of a lighting response system, it may be desirable to rapidly shift from "not present" to "present," but to delay in shifting from "present" to "not present," and thereby err on the side of keeping the lights on sometime after everyone has departed rather than turning the lights off while someone is still present. However, these needs are frequently dependent on the response system. Therefore, in a preferred embodiment, the status generator 135 simply provides the status under consistent and simple rules, and logic within the response system preferably determines how long the status must be continuously "present" or "not present" before responding. More detailed examples will be described further herein.

Applications of the detection system 10 through coupling to a response system 20 have been previously discussed generally in the Background. In summary, it is advantageous for a variety of "smart" devices and other types of response systems to be provided with accurate information about whether one or more people are present in a room or other environment, such that their triggered functions may be activated and deactivated in accordance with this information.

In various embodiments, the response system 20 and its triggered functions may include, but are not limited to:

Lighting which turns on upon a person's entry into the environment, and turns off upon departure.

Environmental controls which maintain one temperature range in a room or floor while people are present, for comfort, and another temperature range while no one is present, for energy conservation.

Voice comprehension algorithms for a voice-based control system such as a personal assistant, which remain active in a processor and ready to receive and parse commands while a person is present, then go into a "sleep mode" when the person departs.

Security monitoring systems which activate video recording and/or audio recording only when someone is present to be recorded. These may in addition, or as an alternative, trigger alarms or alerts for the duration of the person's presence, and then either deactivate the alarm/alert upon the person's departure, or switch to a different form of alarm which indicates that a person was previously present but is no longer there.

Other "smart device" and "smart home" systems known in the art, which respond to a person's presence with certain features (including but not limited to windows, doors, music, screens, and control panels) to meet their expected needs.

Coupling the detection system 10 with any of these response systems 20 is within the ability of those skilled in the art based on the above disclosure, and will improve the performance of the response system 20 accordingly.

Indeed, various such response systems may be implemented by retrofitting existing systems already including some of the preferred components, such as a microphone or other acoustic sensor, one or more processors, and data storage. Certain embodiments of the detection system 10 are therefore implemented in this manner, incorporating additional software instructions encoded within the corresponding response system 20 and executed on an existing processor of the response system 20.

As another possible implementation, such as the one illustrated in FIG. 1, the detection system 10 takes the form of an independent acoustic sensor or networked series of sensors, with a processing unit either built into one of the sensors or networked thereto. The detection system 10 is coupled or networked for communication with the response system 20, and communicates the presence or absence of people through transmitted signals to the response system 20. The intercoupling and networking between components can take various suitable forms known in the art, including but not limited to physical cables, WLAN ("WiFi"), Bluetooth, infrared, RF, cellular networks, or a combination thereof. It is noted that two-way communication between the detection system 10 and response system 20 is not required, although it is preferred to include a channel from the response system 20 to the detection system 10 for confirmation that the signals are being received and understood.

It is further noted that it is within the scope of the invention that a response system 20 be omitted entirely. Instead, in certain embodiments, the detection system 10 simply outputs the presence status parameter by any suitable alert/output measures, such as an audio speaker, log file, printout, or display. In certain embodiments, either in combination with the output or separately, the detection system 10 records the value to a log of suitable form, to be referred to as needed.

Figure 2:
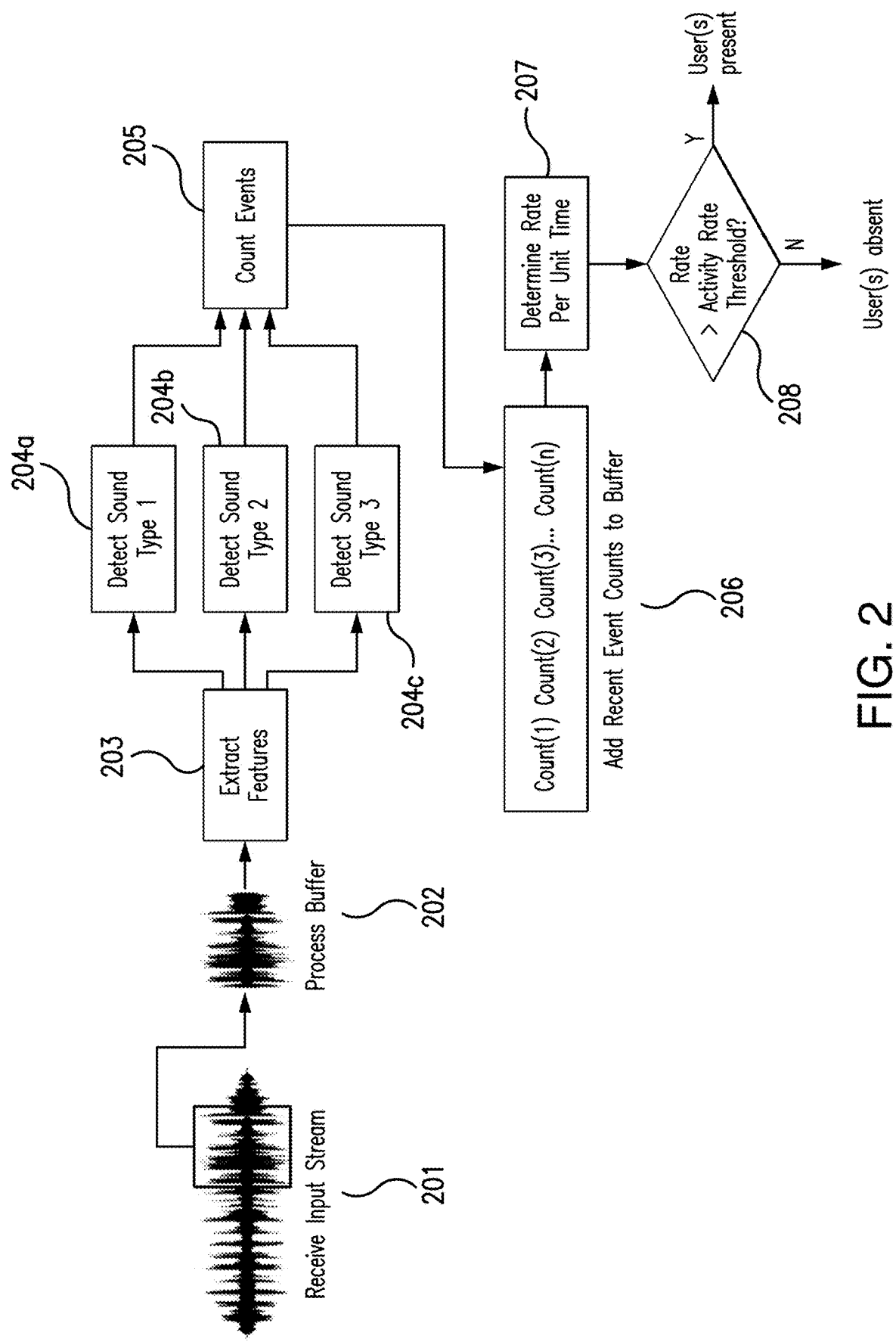
FIG. 2 is a flow diagram illustrating a flow of processes for detecting the presence of users in an environment, in accordance with an exemplary embodiment of the present invention.

FIG. 2 depicts a certain flow of operations to carry out a method for detecting the presence of humans in an environment, according to an exemplary embodiment of the invention.

In the depicted embodiment, a continuous stream of sound input is received from the physical world at operation 201, through through an audio input such as described in relation to FIGS. 1 and 1A. Active processing focuses on a buffer of the recent sound at operation 202, which has been delivered to the processor. As is well understood in the art, this can be configured as a circular or shifting buffer or similar, where older data is discarded while newer data is added. As an example, the time period spanned by the buffer in some embodiments covers about 1 second of time, which is appropriate for clear analysis many human generated sound types. Shorter or longer periods may be worked with, with only minor changes to the implementation. In general, the nature of the target sounds will define their duration, and thus inform the length of time that must be buffered so that they may be analyzed. As discussed below, this buffer may also be shortened in favor of buffering progressive analysis (feature extractions) in its place. If shorter sounds are mixed with longer sounds in the detection schema, then in certain embodiments the feature extraction for the shorter sounds employs sub-windowing of the longer buffer.

The buffer is treated to a feature extraction process at operation 203, in order to produce a set of numerical measurements that contain discriminatory information about the signal in the buffer. Certain embodiments will include a means to extract specific features, including, but not limited to, some or all of: RMS energy, crest factor, spectral shape, spectrogram and similar short window time analysis of spectral shape spaced in time, the periodicity of the spectrogram frequency bins. In certain example embodiments, spectral shape is measured by a discrete Fourier transform (such as an FFT or other means to fit component signal energy), the log or power of such, or the same normalized by RMS energy of the window. In certain embodiments, the extraction processes also include filter banks, or sparse signal decompositions as known in the art.

In configurations where the extracted feature data includes spectrogram type information, which are accumulated from smaller windows spaced over time, in certain embodiments the features are computed progressively and buffered. For example, in certain embodiments a spectrogram is computed by operating on only a short period of sound with an FFT, and storing the FFT output for that time slice, thus enabling more efficient processing in terms of cycle count than repeating the analysis on each shifted window in full. Such an embodiment also allows a shorter sound buffer at operation 202 to accommodate only the data needed for the progressive transforms, thus saving memory. Other embedded signal processing tradeoffs may be applied, which are known in the art, to make the use of memory and processing time efficient for the task.

The feature extraction produces numerical vectors which are then used to detect the target sound types of interest. At operations 204a-204c, independent detectors execute to detect each sound type. While only three independent detection operations are depicted, it is noted that any number of such operations are within the scope of the invention. A variety of suitable detectors are known in the art for implementation herein, including in certain embodiments one or more machine learning mechanisms to map such features into detected classes by training on data using methods, and included but are not limited to support vector machines, logistics regression, random forests, neural networks, deep neural networks, binary neural networks, and so forth. Still other embodiments rely directly on hand-tuned threshold detectors.

One exemplary embodiment uses a support vector machine (SVM), which is configured to make such decisions from the computed features. Typically but not necessarily, such an embodiment includes at least one SVM "learner" component model for each class, which operates to compare the features and determine if it is more like a target sound class or to another non-target noise. The SVM in certain configurations also specifically compares one target sound class to another. As is known in the art, the individual detectors can be combined (e.g. by an error correcting code method) to produce a multi-state final output.

To produce these detectors, a practitioner first collects a set of sample sounds, produce features for them, and train the SVM (or other classifier) to make the necessary distinctions through one or more well-established mathematical convergence methods. For purposes of illustrating a simple embodiment of the present invention, it is assumed in this example that such sounds have already been collected and used to produce fixed detectors or classifiers that can be carried into the software to actuate the detections. However, this is not a limitation on the scope of the invention.

To explain the ideas further, in an example embodiment, the method distinguishes vocalizations type sounds, non-vocal physical "click" type sounds, and background noise. Samples are produced in some embodiments by recording in the target environment and listening for typical examples (vocal noises and interjections plus typing or furniture noises) and marking these time points in the sound recordings. Feature extraction is then employed on both these marked sets of sound event audio period and on miscellaneous background noise periods, to produce training examples for the detector.

Thus the operations 204a-204c are performed in this example by a three class SVM model, which reduces the features extracted at operation 203 to a trinary output: "vocal type sound", "non-vocal activity type sound", "background noise".

At operation 205, the outputted detection events in a given time frame are counted, and collected in a sequential buffer of recent events at operation 206. In one example embodiment, features are processed and classified every ¼ of a second. This, the buffer of event types counts either 0 or 1 for each event type at each ¼ second evaluation period. Other evaluation periods are within the scope of the invention. In certain embodiments, the count at operation 205 occurs over several evaluation periods, and an aggregate sum is buffered at operation 206. In certain embodiments, a weight is also assigned to the counts at either at operation 205 or operation 206 based on the type of feature, its energy, or some other characteristic. The weight preferably reflects the statistical probability that the sound occurrence indicates a user action over some other source. In certain embodiments, this weight is determined from the empirical accuracy of the detectors. In others embodiments, it is predefined for other reasons, or simply adjusted to optimize the overall performance of the system.

A rate per unit time is evaluated at operation 207, typically by taking a mean over the buffer produced at operation 206, although other suitable techniques are known by those of skill in the statistical arts. This rate per unit time represents a degree of likelihood of a user being present (and making the collected noises) within the recent history.

For example, in one embodiment the buffer accumulates over 10 seconds, thus counting the event occurrences in that time period and producing a rate compared to the maximum that could potentially be collected in that time period.

This rate per unit time is then compared at operation 208 to an activity rate threshold. If larger than this threshold, then a user was likely present in the recent buffer history period. If smaller, then a user was either absent or too quiet to detect. This simple threshold process has many more complicated but suitable equivalents which will be recognized by those of skill in the art, including adaptive thresholds, pattern recognition on the buffer sequence, and so forth, none of which would depart from the scope of the present invention.

Figure 2A:
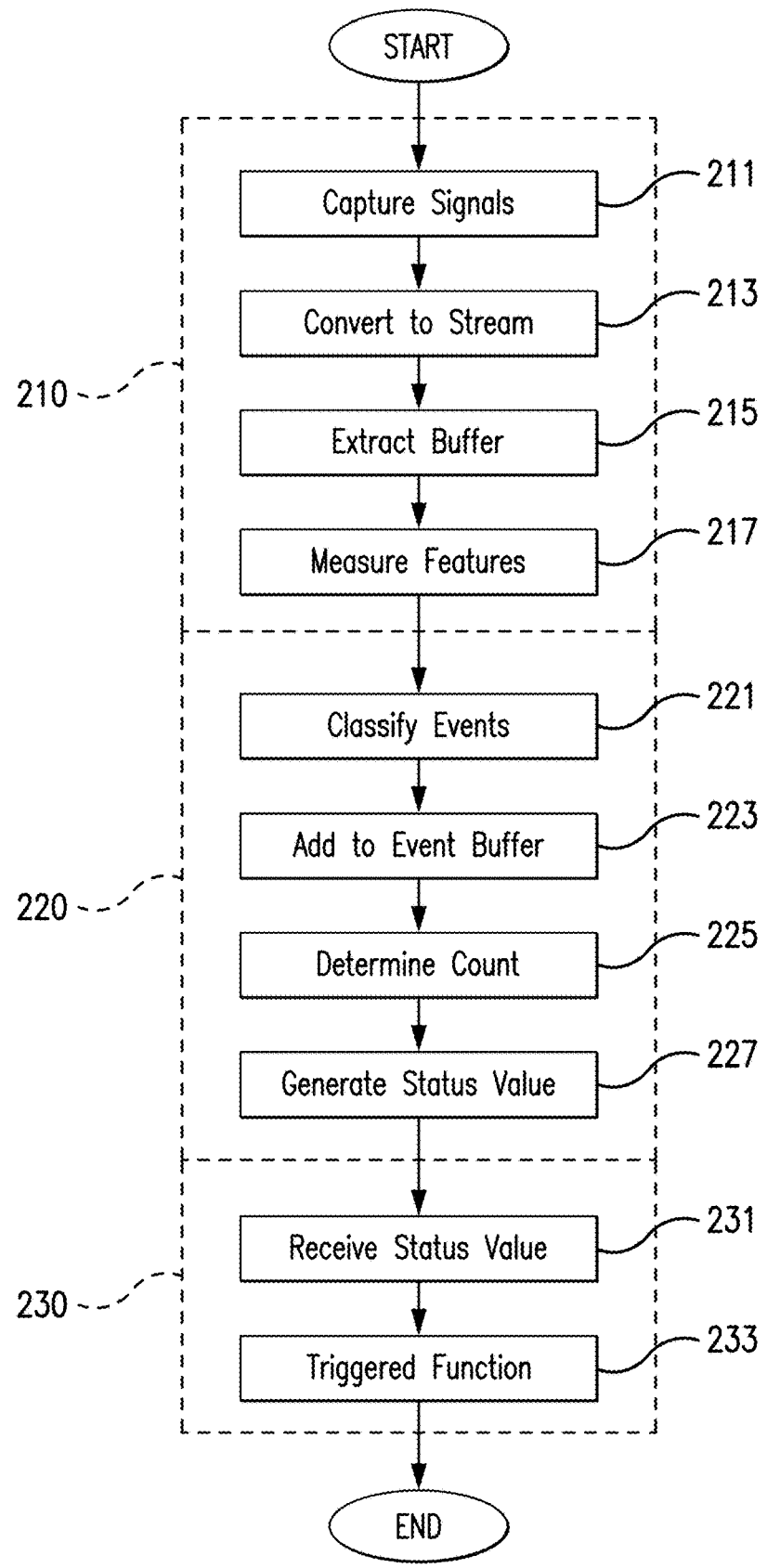
FIG. 2A is a flow diagram illustrating another flow of processes for detecting the presence of users in an environment, in accordance with another exemplary embodiment of the present invention.

FIG. 2A depicts another flow of operations to carry out a method for detecting the presence of humans in an environment, according to an exemplary embodiment of the invention. Generally, the method includes pre-processing operations 210, presence detection operations 220, and response operations 230.

During pre-processing 210, at operation 211, one or more transducers capture sound energy or other vibrations from an environment, which are converted to a digital stream at operation 213.

Preferably, at operation 215, a portion of the digital stream is extracted into a buffer for processing. The extraction buffer includes the most recent portion or segment of the stream. The extraction buffer is preferably a "circular buffer" or "shifting buffer," where older data (sound data) is discarded as newer data is added. The extraction buffer represents a predetermined time period of activity, which will be termed an extraction buffer length. The extraction buffer is preferably updated (and analyzed, in the later steps) multiple times during that period, such that a given extraction buffer includes part of the buffer immediately preceding it, and the portion of the stream extracted in that iteration is added thereto. One example of a time period which may be employed is one second, which is appropriate for clear analysis of many human generated sounds, but other time period lengths are within the scope of the invention. Generally, a suitable extraction time period can be determined from the nature of the expected sounds to be classified. Certain embodiments use a shorter period in order to implement a buffering progressive analysis, which will be discussed further herein.

In various embodiments, suitable combinations of amplification, conditioning, sampling, and resampling are applied at the conversion operation 213, the extraction operation 215, or a combination thereof.

Preferably, at operation 217, various features of the signal as contained in the extraction buffer are measured. Again, these features can include, but are not limited to root mean square (RMS) energy, crest factor, spectral shape, spectrogram and similar short window time analysis of spectral shape spaced over time, the periodicity of such spectrograms, or a combination thereof. Preferably, the measurements are collected and suitably combined to form a vector for later analysis and classification, which will be termed a "feature vector" herein, although other formats may be more suitable depending on the specific nature of the classification operations (such as described below).

Signal features which are measured over a particular time period, such as spectral shape, are in some embodiments measured for the length of the extraction buffer, but in other embodiments are measured repeatedly within a single extraction buffer for smaller windows spaced over time. In the latter case, these features are preferably computed progressively. As one illustrative example, a spectrogram may be computed by operating on a shorter period of sound with a Fast Fourier Transform (FFT), and storing the FFT output for that time slice. This approach enables more efficient processing in terms of cycle count than repeating the analysis on each shifted window in full. When such progressive computations can be applied to all extracted features, this approach also allows for the extraction buffer to be shorted to accommodate only the data needed for the progressive transforms, thus saving memory.

Other embedded signal processing tradeoffs may be applied, according to suitable measures known in the art, to make the use of memory and processing time efficient for the task.

During presence detection 220, at operation 221, the feature data is analyzed according to one or more event classification processes. These processes determine whether a "target" sound type (that is, a sound type which the processes are configured to identify) is indicated by the feature data, and if so, produces a detection event having that sound type.

As previously noted, suitable classification processes include but are not limited to support vector machines, logistics regression, random forests, neural networks, deep neural networks, binary neural networks, and manual configuration. For example, in one embodiment, one or more support vector machines (SVMs) are configured or trained to determine, based on specific feature values, whether a sound is more likely to be one type of sound event as opposed to another one type of sound event; or, in the alternative, whether a sound is more likely to be one type of sound event as opposed to any other type of sound event. Training processes for SVMs, given an expected set of data points and one or more "target" determinations, are known in the art and will not be elaborated on herein. It will be assumed in these disclosures of the system and method that the SVM, or other event classifier or classifier component, is already suitably trained to classify the sound events as desired. However, it is also noted that many such trainable classifiers can continue to "learn" after the initial training, if so configured, and are thereby updated to variations in the sound types as operation continues.

In a preferred embodiment, individual classifications are made by separate classifiers using the buffer data, which are combined to produce a multi-state final output for the most likely candidate of the sound type, for example by an error correcting code method. A probability or accuracy determination is also included in the detection event in certain embodiments, which is included in later weighting processes.

As more accurate classification techniques become available, it is increasingly possible that two or more sounds will both be identifiable within the same extraction buffer. It is noted that generation of multiple determinations at operation 221 is within the scope of the invention, and one of skill in the art will be able to extrapolate these disclosures accordingly. However, for simplicity of description, going forward it will be assumed that the analysis at operation 221 generates a single event determination, through a combination of all individual classifications into a "most likely" source of a single, dominant sound within the extraction buffer being analyzed.

It is important to observe that neither the disclosed classification techniques nor any other such techniques known in the art are ideal for all circumstances. Thus, sometimes a classifier will incorrectly determine that a particular sound has occurred (false positive), and other times will incorrectly fail to recognize the particular sound (false negative). The frequency of these errors can be determined empirically during training in determining the optimal techniques to be employed for a given embodiment and application.

Additionally, in order to compensate for the uncertainty of the output, the result is preferably not based upon any single detection, but upon the cumulative detections counted over a period of time. The rate of detections thus compensates, in a Bayesian frequency sense, for less than perfect accuracy.

Therefore, at operation 223, the new detection event, if any, is added to an event buffer. The event buffer is preferably maintained as a "circular buffer" or "shifting buffer," where older data (detection events) is discarded as newer data is added. The event buffer represents a predetermined time period of activity, which will be termed an event buffer length. The event buffer length is preferably of greater length than the frequency of generation of detection events, such that the entire buffer is not replaced with each update but continues to reflect less recent events as newer events are added thereto.

Each detection event is preferably assigned a numerical value in the event buffer. In a simple embodiment, each event which tends to indicate the presence of a person is assigned the value "1" while each event which tends not to indicate the presence of a person is assigned the value "0" (or is simply not provided to the event buffer at all). However, in various embodiments, the values reflect certain weights already described herein, which can include but are not limited to the probability that an event type indicates the presence of a person, the general error rate of the system in identifying the event type, a probability that the individual event was correctly classified, or a combination of two or more of the above.

It is noted that the weights, if implemented, need not exactly be the values they reflect. As one example, a system which is 50% accurate at classifying "footfall" events and 80% accurate at classifying "door slam" events need not apply a 0.4 weight to footfalls and a 0.8 weight to door slams, or even twice the weight to door slams as to footfalls, but merely applies a greater weight to the door slams than to the footfalls, all other considerations being equal.

At operation 225, the numerical values of the detection events presently in the event buffer are summed to produce an aggregate event count. The aggregate event count need not be re-determined every time the event buffer is updated, although this is preferred. It is also preferred that, at minimum, the aggregate event count is re-determined with a period shorter than the event buffer length.

At operation 227, a value for a presence status parameter, which is an indicator of the presence of one or more users, is generated according to the aggregate event count. In certain embodiments, the presence status parameter has a Boolean value of present/not present, while in certain others it has a probability value. A new status value need not be generated every time the aggregate event count is re-determined, although this is preferred. It is also preferred that the generation of new values for the status parameter has a predetermined period length shorter than the event buffer length. The values are thereby generated multiple times before all data presently in the event buffer is discarded.

Various specific approaches may be employed for the value generation in various embodiments. For example, in one simple embodiment, the value is positive or "true" if the aggregate event count exceeds a predetermined activity threshold, and negative or "false" if not. In another embodiment, the value is positive or "true" if a count rate over time exceeds a predetermined activity threshold, and negative or "false" if not. The count rate over time can be computed over both the length of the event buffer and over shorter periods simultaneously.

Furthermore, if the presence status parameter has a probability value, in certain embodiments, the value scales upward from 0% to 100% as the aggregate event count surpasses each of a set of thresholds, or according to other statistical methodologies known in the art. In other embodiments, the probability value is more simply the aggregate event count divided by a maximum possible count over the same period.

At operation 231, the presence status parameter value is transmitted to a response system, which responds by actuating a triggered function appropriately at operation 233. As noted previously, numerous responses to a positive or negative value, or a particular probability, are possible even for a particular type of response system, and in a preferred embodiment are configurable according to the needs and preferences of the user.

In one exemplary embodiment and configuration, the presence status parameter is generated every quarter second, and the response system is a lighting system in a room. The lighting system includes one or more light sources, and a processor coupled to the light sources for turning on and off the lights in an automated manner. In this room, it is desired that the lights rapidly respond to a person's entry, but also that silence be treated as possibly a person still being present but remaining silent.

Figure 4:
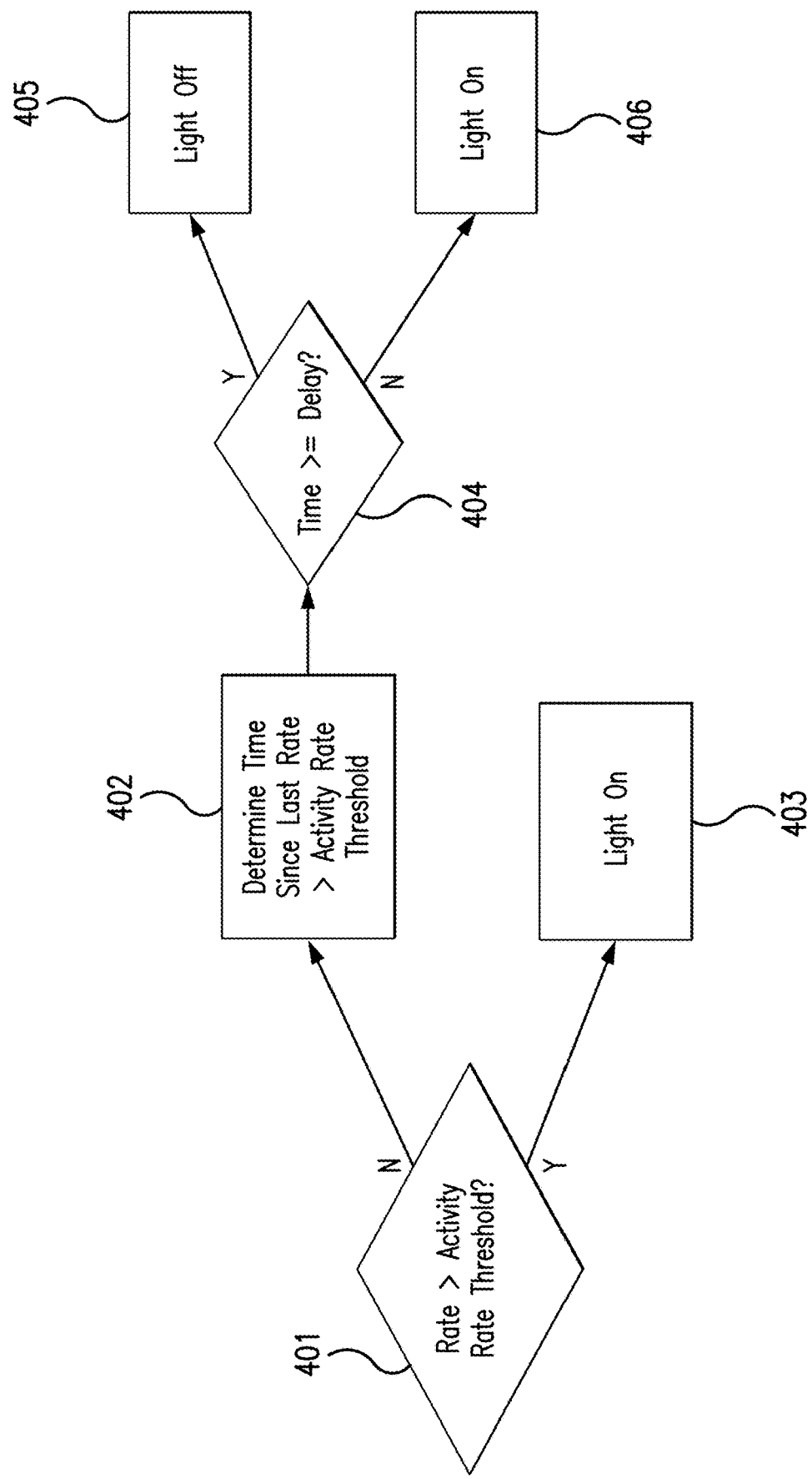
FIG. 4 is a flow diagram illustrating a flow of processes for responding to the presence or absence of users in an environment, in accordance with an exemplary embodiment of the present invention.

FIG. 4 depicts one simple implementation of operations for such a lighting system, according to an exemplary embodiment of the invention. In the depicted embodiment, at operation 401, it is determined whether an activity rate (e.g. the number of detection events in the aggregate count of the event buffer) exceeds a predetermined activity threshold. If so, the presence status parameter has a positive value (for example, a Boolean "true"). Based on this positive presence indicator, the system turns on the lights at operation 403.

If the activity rate does not exceed the predetermined activity threshold, the presence status parameter has a negative value (for example, a Boolean "false"). Based on this negative presence indicator, at operation 402, it is determined how long it has been since the indicator was positive. This can be determined by a timer which counts down from a predetermined delay value, which resets every time a positive presence indicator is received, or by a record which logs the time of the most recent positive presence indicator. At operation 404, it is determined whether the time since the last positive presence indicator equals or exceeds a predetermined delay value. If it does, then at operation 405, the lighting system turns off the lights. If it does not equal or exceed the predetermined delay value, then at operation 406, the lighting system turns on (or, more likely, maintains an "on" state of) the lights. It is noted that the "response" to many of the individual received values or indicators is, in this context, effectively "do nothing" or "maintain the status quo."

In a more complex implementation which assumes probability values for the presence status parameter, the lighting system is configured such that, after it receives a presence value over 75%, it turns on the lights. If eight of the next eleven presence values are not over 50%, a false positive is assumed, and the lights turn back off. However, once those additional presence values are received, it is assumed that a person is indeed present. Thereafter, the system will turn off the lights only after 250 consecutive presence values (that is, a full minute) are below 10%, or after 1200 consecutive presence values (that is, five minutes) have no more than 60 presence values over 25%, to ensure that a short quiet period from the person does not result in enough negatives to turn the lights out before they leave.

As can be seen from these examples, the response system can be fine-tuned in numerous ways to react in a desired manner, using an otherwise identical detection system. Such configuration is managed through logic in either the response system or the detection system in various embodiments.

Suitable configurations for other response systems, such as those previously identified, can easily be imagined and implemented by those of skill in the art.

Figure 3:
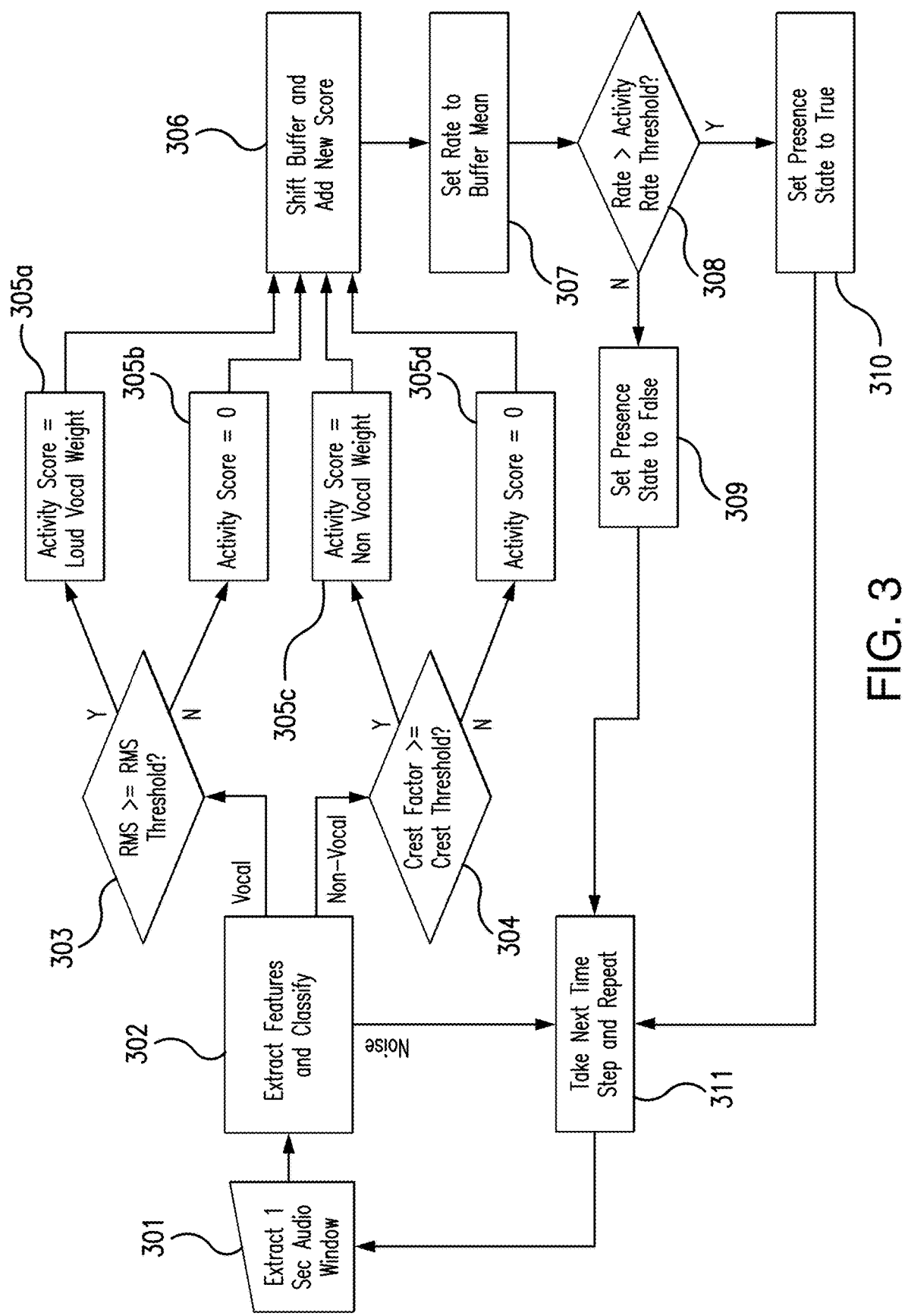
FIG. 3 is a flow diagram illustrating a flow of processes for classifying a sound to generate a detection event with a numerical value, in accordance with an exemplary embodiment of the present invention.

A simple exemplary embodiment of the event classifier 131 will now be presented, and details of its event classification process 221 and related processes will be depicted in FIG. 3. It should be apparent to those of skill in the art that other practical implementations of the invention may use more complex operations, but those of skill in the art will be able to extrapolate such implementations from the present disclosure. Nonetheless, even at this simple illustrative level, it will be shown that multiple (for example, five) types of detection events may be generated.

The event classifier 131 in this example includes a three class SVM model, which receives a feature vector and generates one of three classes from an instant determination of the feature vector: "vocalization," non-vocal "physical activity," "background noise." Training data for this SVM has been produced by recording in the target environment and listening for typical examples and marking these time points in the sound recordings. Feature extraction has been employed on both these marked sets of sound event audio period and on miscellaneous background noise periods, to produce training examples.

This example embodiment extracts a one second audio window at operation 301, as previously discussed. This is processed at operation 302, as previously discussed, by extracting features from the sound window, and classifying those features using a support vector machine (SVM) to produce an instant SVM classification for the window. The processing at operation 302 also computes an RMS and a crest factor for the window.

If the classification output is "Noise," the process proceeds to operation 311, which increments the time frame for the buffer to address the next audio window.

If the classification output is "vocal", the RMS energy is compared to an RMS threshold at operation 303. If the RMS energy is greater than the threshold, then the instant activity-score is set at operation 305a to a "Loud Vocal Weight" that is either predetermined or determined from the RMS. If the RMS energy is less than the threshold, the event is considered a likely false positive and the instant activity score is set to 0 at operation 305b.

If the classification output is "non-vocal", the crest factor is compared to an crest threshold at operation 304. If the crest factor is greater than the threshold, then the instant activity-score is set at operation 305c to a weight that is either predetermined or determined at the time, and if less than the threshold, set to 0 at operation 305d.

The process continues by shifting an activity score buffer and adding this new instant activity rate value to that buffer at operation 306. As discussed with respect to previous figures, this buffer is shifted, discarding the oldest value. Then, a rate is determined at operation 307 as a mean (average) over the buffer, or using other suitable techniques previously referenced.

This activity rate value is then compared at operation 308 to another predetermined threshold, the activity threshold. If larger than this threshold, a decision of "Presence State True" is produced at operation 310. Otherwise, a decision of "Presence State False" is produced at operation 309. Again, "true" indicates it is likely that a user has made a target sound in the buffered time period, while "false" indicates it is likely that no user has made such a sound, and therefore they may no longer be present.

After this determination is made, the process goes to operation 311, which increments the time frame for the buffer, and then returns to the beginning to process the shifted audio buffer in the next loop of the process.

Figure 3A:
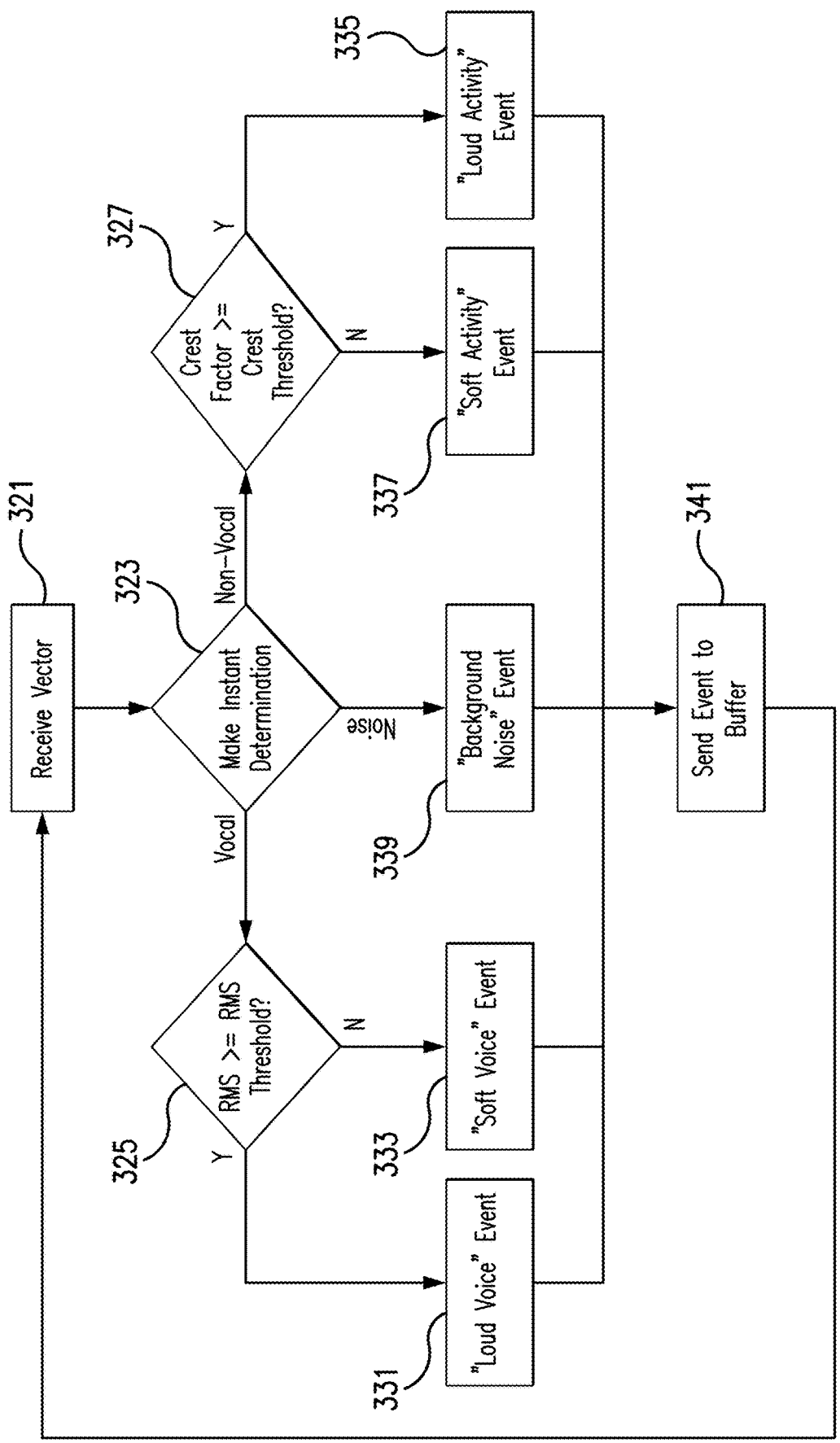
FIG. 3A is a flow diagram illustrating another flow of processes for classifying a sound to generate a detection event with a numerical value, in accordance with another exemplary embodiment of the present invention.

Details of another exemplary event classification process 221 are illustrated in FIG. 3A. At 321, a feature vector from the extraction buffer is received, which has been measured from the current contents of the extraction buffer. This feature vector includes, among its features, values for root-mean-square (RMS) energy and crest factor.

At 323, the SVM generates an instant determination as to which of the three general classes is most likely indicated by the contents of the extraction buffer, given the feature vector and prior training.

If the instant determination at 323 is "vocalization," then the event classifier performs an additional check at 325. Specifically, the RMS energy value is compared to a threshold value for vocal type sounds. RMS energy is selected in this instance because it captures overall energy on a sustained event. RMS might likewise be used to threshold other sustained sound types in various other embodiments for other settings.

If at operation 325 the RMS energy value is greater than the threshold, the vocalization is categorized as a "loud" vocalization, which is highly indicative in this context of a person being present in a monitored space or area. The event classifier generates a "loud voice" detection event with a value of 0.95 at operation 331, which is sent to the event buffer at operation 341, and then the process returns to operation 321 to receive the next feature vector.

If at operation 325 the RMS energy value is less than the threshold, the vocalization is categorized as a "soft" vocalization, which is somewhat likely in this context to indicate a person is present, but is equally likely to be a "false positive" (for example, not a true vocalization at all). The event classifier generates a "soft voice" detection event with a value of 0.5 at operation 333, which is sent to the event buffer at operation 341, and then the process returns to operation 321 to receive the next feature vector.

If the instant determination at operation 323 is "physical activity," then the event classifier preferably performs an additional check at operation 327. Specifically, the crest factor value is compared to a threshold value for physical activity type sounds. Crest factor is selected in this instance because sounds of physical activity are expected to be short transients, and it is thus a better measure of the likelihood of actual presence of such an event than (for example) RMS over the entire window. In other embodiments, other short transient noise types might be treated similarly.

If at operation 327 the crest factor value is greater than the threshold, the vocalization is categorized as "loud" physical activity, which is moderately likely in this context to indicate a person is present. The event classifier generates a "loud activity" detection event with a value of 0.7 at operation 335, which is sent to the event buffer at operation 341, and then the process returns to operation 321 to receive the next feature vector.

If at operation 327 the crest factor value is less than the threshold, the vocalization is categorized as a "soft" physical activity, which is rather unlikely in this context to indicate a person is present. The event classifier generates a "soft activity" detection event with a value of 0.15 at operation 337, which is sent to the event buffer at operation 341, and then the process returns to operation 321 to receive the next feature vector.

Finally, if the instant determination is "background noise," then at operation 339 the event classifier generates a "noise" detection event with a value of 0. This is sent to the event buffer at operation 341, and then the process returns to operation 321 to receive the next feature vector. (In an alternate embodiment, because the value is 0, no event may be sent to the buffer at all.)

The exact values presented above, as well as the specific processes for distinguishing one type of sound from another, are but illustrative examples, and can be considerably altered without departing from the scope of the invention. In particular, it is expected that the thresholds, and the corresponding different weights, will be the result of fine-tuning for the selected environment, which is produced by the training process, manual adjustments during and after initial configuration, or both.

Additionally, instead of weighted values, a simple 1 or 0 value could result from some or all possible results. In particular, in some configurations or embodiments, the "soft" types each have a 0 value, and are thus removed from consideration by thresholding.

Thresholding such as this is one mechanism that can be applied to limit false positives for any sound class in a live environment. Audio channels in quiet environments (particularly if automatic gain control or other adjustments are employed in the channel, but also generally) will never be completely quiet, but instead will exhibit noise. Other noise will be added by the digitization process. Even "quiet" environments typically have ongoing background noises, such as building infrastructure, computer and air conditioning fan noise, and noise leaking in from other activity outside the target environment space. This is an important factor to consider when used to monitor quiet environments with quiet activity sounds. False positives can easily arise in such circumstances because the classification component attempts to classify whatever noise is present rather than waiting for an actual sound event. It is preferred to include means to control the situation, which the described thresholding provides. In other embodiments, the thresholding takes the form of "noise gating" or similar processing on the audio input channel.

Some of these background noises will in some instances be louder than the user-generated sounds the system aims to detect. As such, the classifier is preferably the primary mechanism to distinguish non-user noise from user-generated sound events, with thresholding to provide a secondary layer of screening based upon the type of sound event detected.

An equivalent to thresholding may also be accommodated, in certain other embodiments, directly in the classifier (SVM, neural net, or any other type) by explicitly emphasizing RMS and crest factor in the input. However, in the processes illustrated in FIGS. 3 and 3A, they are considered independently, in part because this is simpler to depict, and in part because it demonstrates that the thresholding need not be absolute but in certain embodiments may merely reduce the weight of the event.

Figure 6:
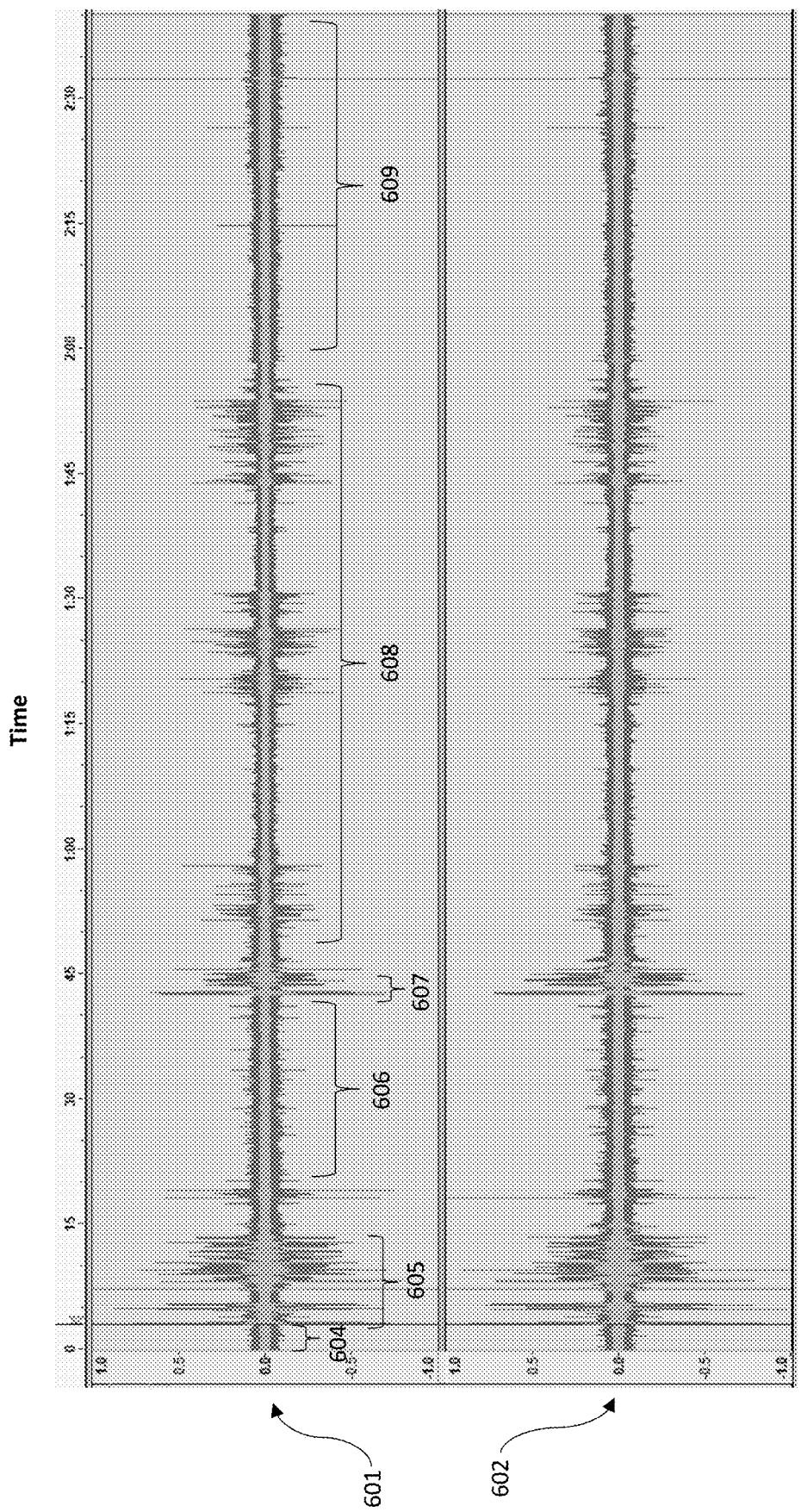
FIG. 6 illustrates an example use case for processing by a system for detecting the presence of users in an environment, in accordance with an exemplary embodiment of the present invention.

FIG. 6 illustrates the input for a simple but representative use case, in which a stereo audio waveform is recorded for approximately 2 minutes and 45 seconds. Waveform representations of the recordings for a left channel 601 and a right channel 602 are charted in FIG. 6, with amplitude (−1 to 1) tracked along the vertical axis and Time along the horizontal axis. The audio is recorded during periods of various normal activities and periods of no activity in an office environment.

In the recorded audio, time period 604 contains background noise, in an empty room. Period 605 contains the sound of entry by three individuals into the room and vocal interaction between them. Period 606 contains the sounds of a period of quiet work and typing on computers. Period 607 contains the sound of a knock and some background noise outside the room. Period 608 contains the sounds of a longer period of quiet work, with areas of quiet background, of typing and mouse clicks, and miscellaneous louder background noises such as furniture creeks, paper rustles, and so forth. Finally, in period 609, the activity ceases, individuals depart, and the room reverts to background noises (air conditioner, computer fans, distance carried activity sounds, etc.) with no further human activity in the immediate area.

An exemplary embodiment and application, such as the lighting system application previously described with regard to FIG. 4, can be applied to leverage information in this audio signal in making intelligent decisions about when to turn on or off a room light. In this example application, the lights of the lighting system turn on when people are present and turn off when they depart, and the detection system makes specific determinations of user presence based on sounds of vocal and non-vocal user activity, to base lighting control for the room based thereon.

At many points in the example input, sound indicating user presence sounds are very quiet, while background sounds of other types are notably louder than the activity sounds, but all are preferably considered in the determinations. As an example, consider that many portions of period 606 and 608, with activity, are quieter than portions of 609 or 604, which contain only background noise. Likewise, period 607 is a loud external event not consistent with human activity in the room and should be properly ignored. This provides an advantage over prior known approaches based solely on, for example, the sound amplitude in the room.

Figure 7:
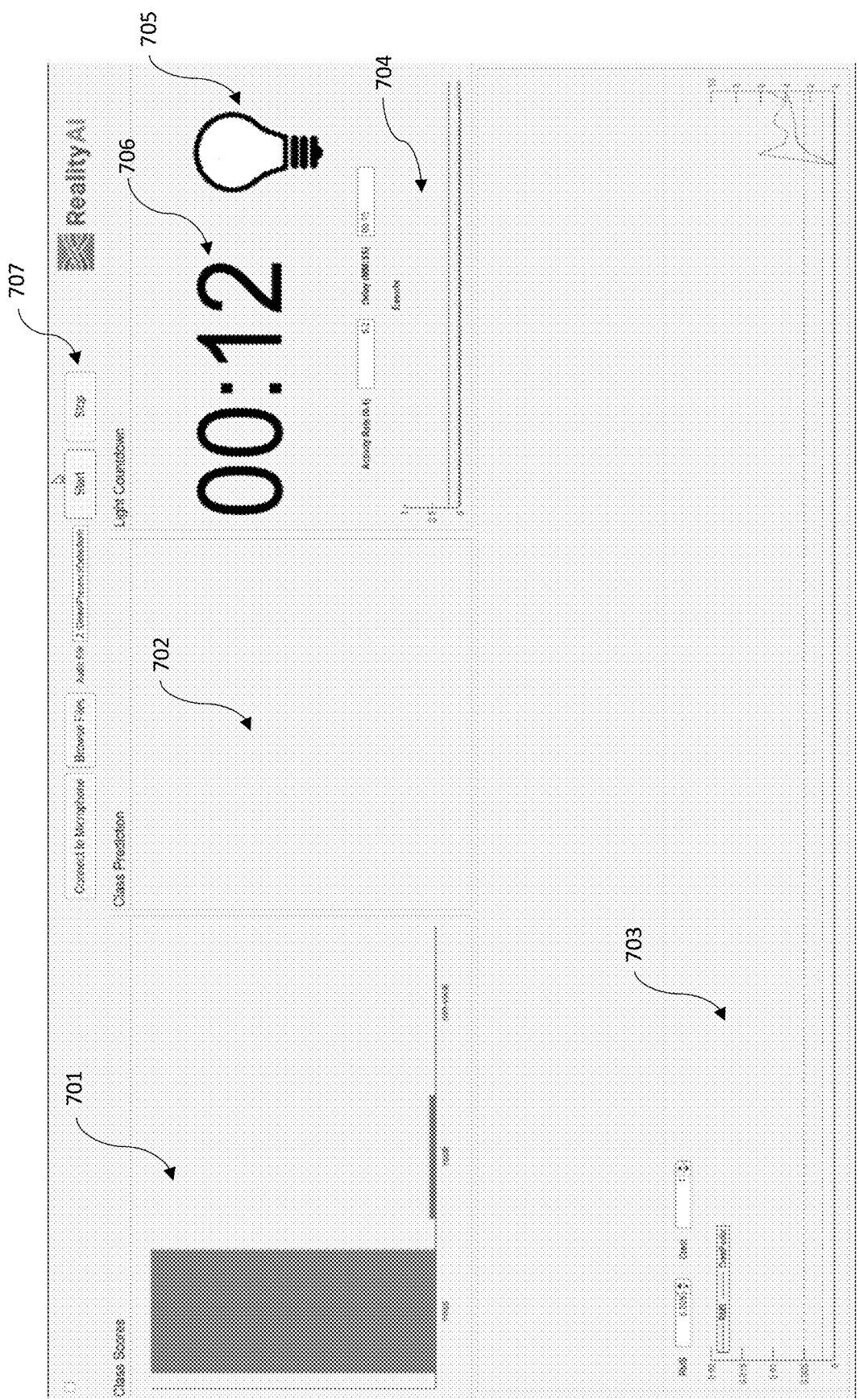
FIG. 7 is a depiction of a graphic user interface (GUI), in accordance with an exemplary embodiment of the present invention.

FIG. 7 illustrates an implementation of an example graphic user interface (GUI) which may be used in accordance with certain embodiments of the present invention. This example interface illustrates certain technical details of the system operation, for clarity of explanation. It is important to note that this level of informational detail, and indeed a graphic-based interface of any kind, is not a requirement of the invention. To the contrary, in a practical setting as might be deployed in a product, some embodiments of the invention operate on audio input, an embedded processor unit, and suitable measures for electrically switching power to a light source responsive to an embedded processor unit. Concealing these features in a smart light switch is within the ability of one of ordinary skill in the art. More generally, it will be recognized that a variety of interfaces are suitable for the invention, and may be adapted to different specific implementations. However, for purposes of explanation, these graphics are helpful.

In the illustrated implementation, the display is divided into multiple sections. Section 701 displays a report of the relative class scores for the current instant in time, as determined by the various classifiers. Section 702 displays an icon when a particular sound type of significance occurs in the room. In certain embodiments, such significant sounds include vocal activity including speech and non-speech sounds, and non-voiced activity such as that described for period 608 in FIG. 6. Section 703 displays a graph of RMS and crest factor levels, which have already been described in relation to certain embodiments of this invention. Section 704 displays a graph of human activity counts per unit time, which in certain embodiments is a suitable decision criterion for turning off the light in an intelligent fashion. Section 705 displays an icon indicating when the light is on or off. Section 706 displays a timer which will count down once the count per unit time falls below a preset level. Section 707 displays various controls for starting and connecting the system.

Sections of the example GUI illustrated in FIG. 7 will now be further illustrated displaying information in response to the example audio sequence illustrated in FIG. 6.

Figure 8A:
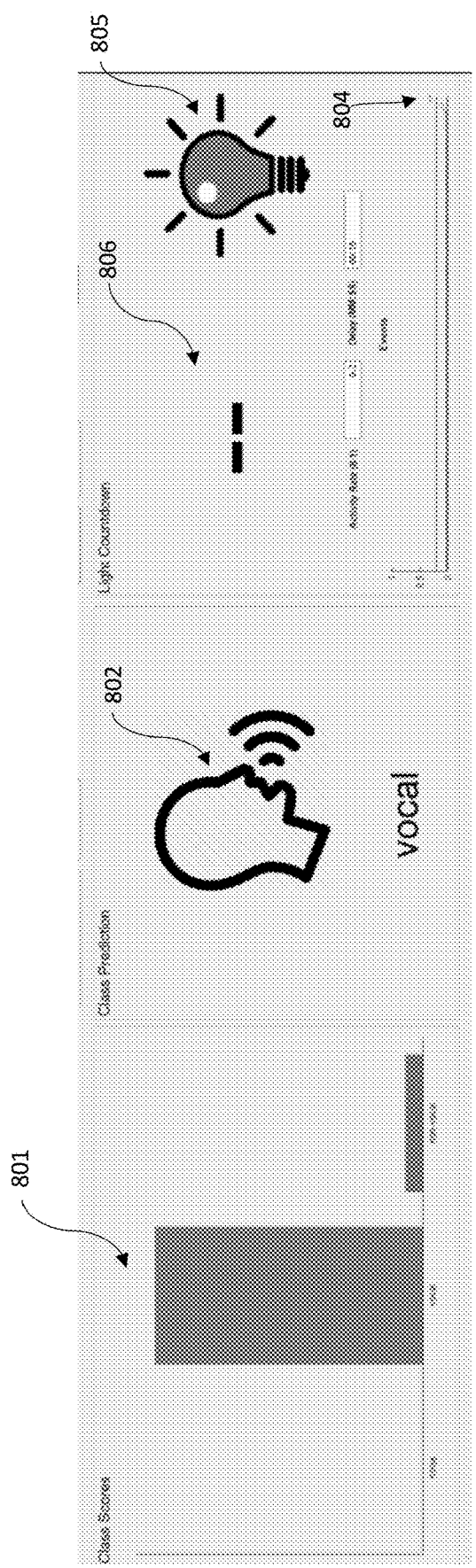

Specifically, FIG. 8A reflects period 605 from FIG. 6. The occupants move into the room and begin talking. In certain embodiments of the system, the triggered response (in the illustrated embodiment, turning the lights on) actuates upon a specific key word to be uttered (e.g. "light on"), while in other embodiments simply talking or making other noise in the room is sufficient.

The GUI elements in FIG. 8A reflect the state of the system during period 605. At this stage, various presence detection operations, which can include but are not limited to operations described with regard to FIGS. 2, 2A, 3, and 3A, have determined that the most likely content of the audio is the "vocal" class. This determination is reflected in the class score displayed at 801, which shows the "vocal" bar being tallest. The class determination is resolved to a "vocal" event, as displayed at 802. The activity event count graph, displayed at 804, has moved above the threshold for declaration of user presence, and thus the light is turned on, as displayed at 805. The countdown timer displayed at 806 is cleared.

Figure 8B:
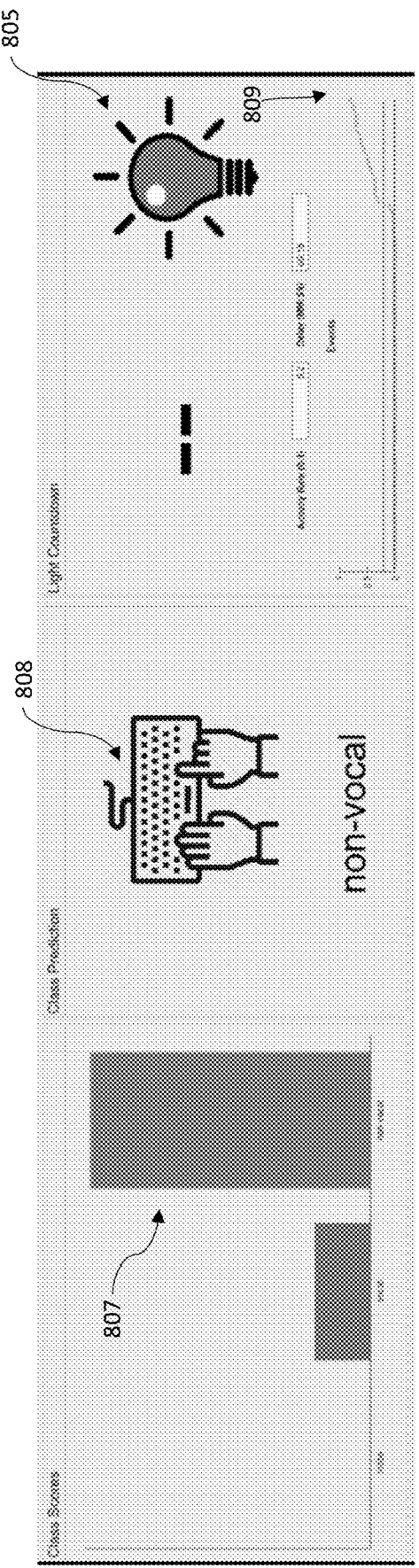

FIG. 8B likewise reflects the state of the system during a quieter activity period 606 from FIG. 6. In FIG. 8B, non-vocal activity noise is the inferred class, according to the class score displayed at 807 and class determination indicated by the icon at 808. The activity rate graph displayed at 809 continues to climb, and the light remains turned on, as displayed at 805.

During the course of the activity periods illustrated in FIG. 6, there are moments where the occupants pause in making noise, and the system's instant class determination reverts to background noise. One such moment is reflected in FIG. 9A. Here, the leading class score, displayed at 901, is noise, and the activity class determination displayed at 902 is blank. However, the recent event rate graph displayed at 904 remains well above threshold, so the countdown displayed at 903 is not started and the light remains turned on, as displayed at 905. A feature of this embodiment is that the instant determination of sound type is a factor in the "light off" decision, but the final decision is resolved in aggregate so as not to leave an occupant in the dark during a momentary lull.

As shown in FIG. 9B, if the activity rate drops below a predetermined threshold (as displayed at 909), the light-off countdown displayed at 906 is triggered. We can see in the graph pattern at 909 that the rate of events dropped below the threshold line, but has begun climbing up again. In this embodiment, the countdown time provides a second level of protection against users being left in the dark due to work/ activity pattern lulls.

In the illustrated embodiment, the countdown time is set just long enough to avoid false quiet periods, but in other embodiments it may be set longer according to the needs of the particularly intended embodiment and application. For example, in certain embodiments designed for power saving in a large building, time-out periods of 30 minutes or more may be used, to balance the power savings against user annoyance and against the practical fact that switching lights on and off may diminish their overall service life.

Figure 10:
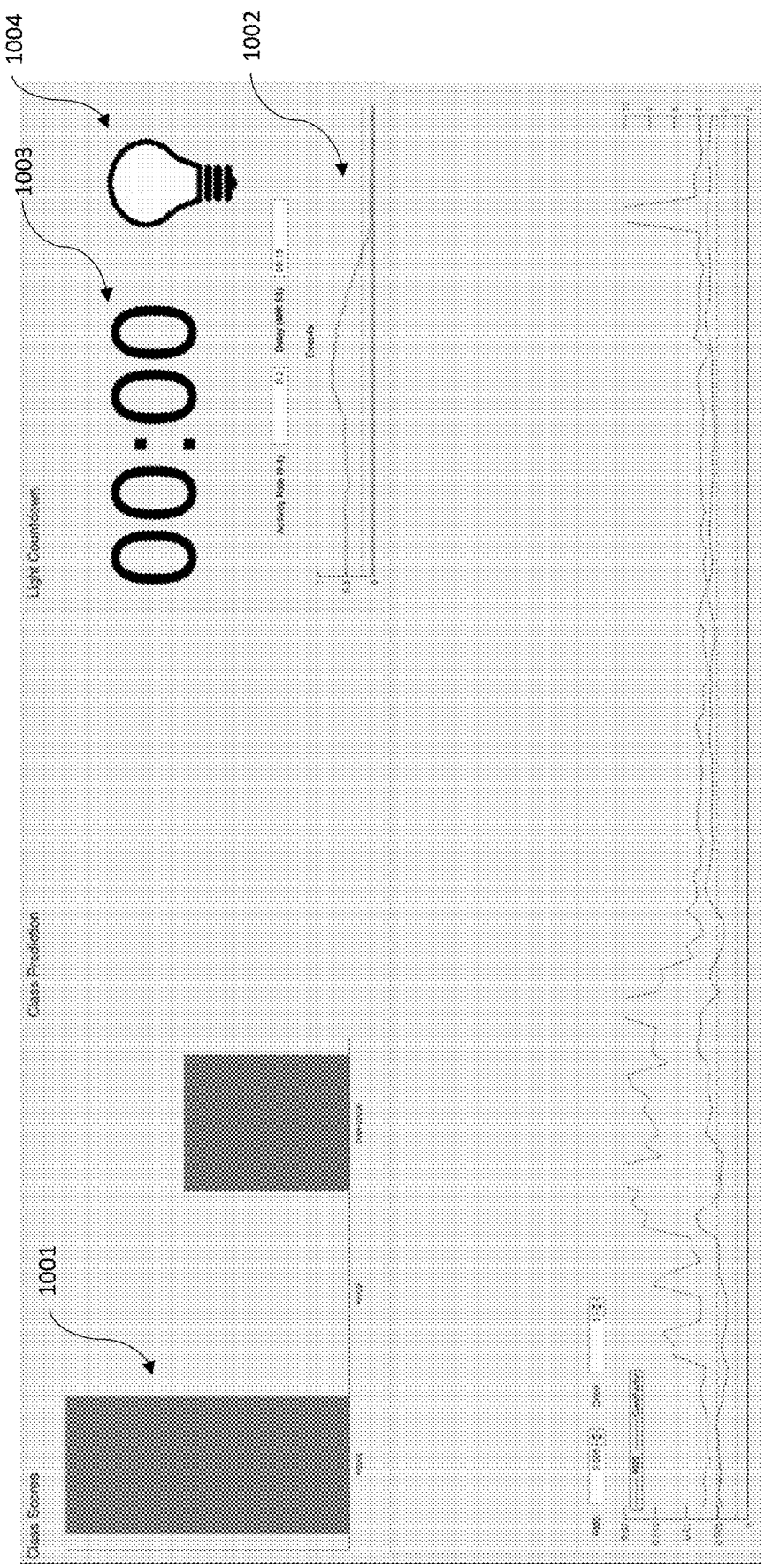

In the illustrated embodiment, once the room is devoid of user-specific sounds for a long enough period (as may be predefined or adaptively learned), the lights are turned off. FIG. 10 illustrates such circumstances, corresponding to the later portions of period 609 in FIG. 6. We see that the instant class determination displayed at 1001 remains "noise," the event rate displayed at 1002 remains below threshold, and the countdown timer displayed at 103 has expired. The light is therefore turned off, as displayed at 1004.

Figure 11:
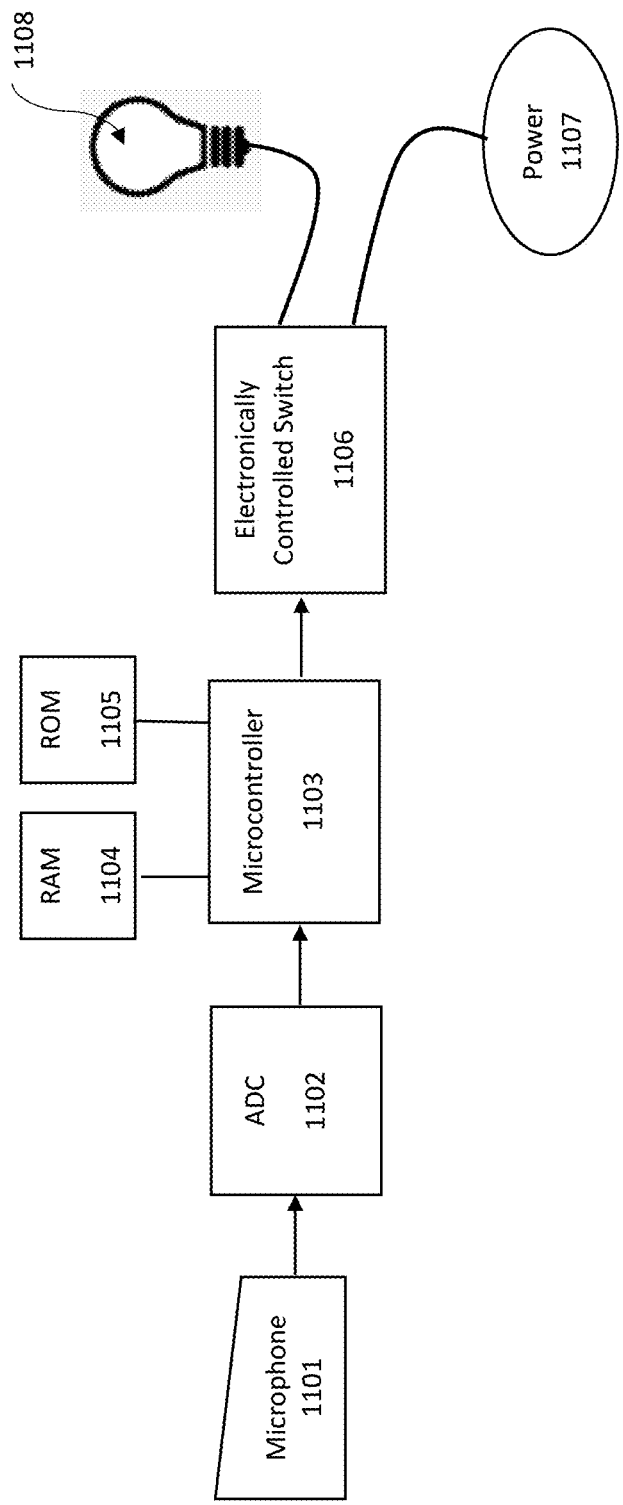
FIG. 11 is a block diagram illustrating another system for detecting the presence of users in an environment, in accordance with another exemplary embodiment of the present invention.

FIG. 11 illustrates one example embodiment of the system in an actual product, capable of operating as described with respect to FIGS. 6-10. As noted earlier, the GUI illustrated in FIGS. 7-10 is not necessary in all embodiments and therefore omitted in the illustrated embodiment. This embodiment also has minimal external connections. In one example embodiment, the system may be embedded in a very small microcontroller and hidden in, for example, a wall switch or overhead fixture.

The illustrated embodiment includes one or more microphones 1101 or similar transducers to capture room sound. The microphone 1101 is coupled to an analog to digital converter (ADC) 1102, or similar means to render acoustic vibrations into electrical signals. The ADC 1102 is in turn coupled to a microcontroller 1103, which executes the input processing, and the progression of operation described in other figures. The microcontroller 1103 also controls the lights via an electronically actuated switch 1106.

As is known in the art, a microcontroller such as 1103 typically includes internal RAM memory 1104, as illustrated in FIG. 11, in which to maintain its state and store data and results of computations. It also typically includes some amount of non-volatile ROM memory 1105, as illustrated in FIG. 11, which contains the program code and model parameters necessary to receive data, execute the given operations/processes, and control the switch.

The switch 1106 receives a digital signal from the microcontroller 1103 and sets its switch state responsive to that signal. Suitable switching mechanisms are known in the art, and include but are not limited to relays, solid-state relays, transistors, and so forth. The switch 1106 makes or breaks the connection between a power source 1107 and a light fixture 1108, in accordance with the digital signal from the microcontroller 1103.

In certain implementations, all of the illustrated components are be placed in a single enclosure, while in other implementations, the switch 1106 is be remote from the microcontroller 1103, with a suitable communications network introduced between the two. The one or more microphones 1101 are also placed remote from the other components in certain embodiments.

As discussed, the system is preferably trained to recognize specific sound types using a machine learning approach. In a preferred embodiment, both vocal and non-vocal sounds are recognized using learned time-frequency components typically characteristic of the given sound class. Time-frequency components are recognized using a frame by frame analysis on short periods of time such as, for example, 1/16 to one second. As audio energy data enters the system and fills the buffer, a frame is analyzed for a prediction, and then the signal window is shifted so that a next window is similarly analyzed. Both overlapping and non-overlapping windows are within the scope of the invention.

In the example embodiment just illustrated, the machine learning method considers time-frequency features that are constructed from logarithmically spaced mel-spectral bands, as are commonly understood in the field of signal processing. The frequency bands are considered over a series of windows, to construct a spectrogram style time-frequency representation, and rectangular subspaces from this representation provide the input for training of an SVM type machine learning model. The model learns which spectral bands and time patterns best represent the target classes, in this case, vocal and non-vocal office noises from human occupants.

The method is not specifically restricted to these analysis features or machine learning methods, but in various embodiments can use any suitable combination thereof. Preferably, the sound classes are represented using time-frequency representations, and these features are reduced by the machine learning model to a true/false instant determination for the presence of sound class types. By discovering the salient time frequency band with machine learning, the specific, complex patterns of the target sounds are isolated from being embedded in equally complex background noise. In contrast, establishing a broad representation of a class type's background noise statically by hand analysis is an intractable problem.

Figure 12:
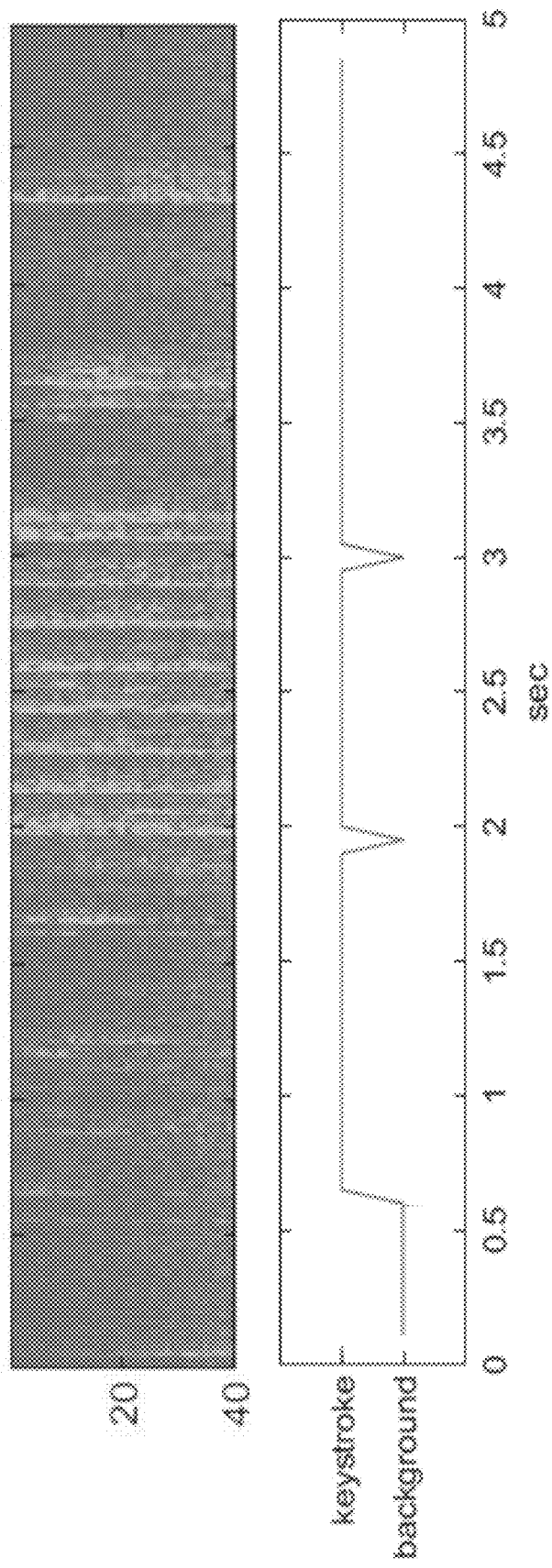
FIG. 12 illustrates a spectrogram input and corresponding sound-type determinations for a method for detecting the presence of users in an environment, in accordance with an exemplary embodiment of the present invention.

FIG. 12 provides some insight into the challenges of this application example. The upper plot of FIG. 12 displays a mel-spectrogram with a five-second period of sound transitioning from background noise to typing keystrokes. The upper plot organizes 40 mel-spectral bands vertically and time horizontally. Brighter points indicate stronger energy at that time-frequency point. As can be seen, there is a wide variety of activity over the five second period. The keystrokes and background noise are by no means uniform and easy to identify.

The lower plot in FIG. 12 illustrates the output of an SVM inference process, from which we see that, nonetheless, the trained model makes clear distinctions about when typing keystrokes are present and when there are brief pauses in the typing activity. The key changes are not apparent to the eye looking at the spectrogram because of the number of louder background noise elements mixed into the signal. The machine learning model identifies subtle sounds of typing that remain similar regardless of the overlaid noises.

These and related processes, and other necessary instructions, are preferably encoded as executable instructions on one or more non-transitory computer readable media, such as hard disc drives or optical discs, and executed using one or more computer processors, in concert with an operating system or other suitable measures.

In a software implementation, the software includes a plurality of computer executable instructions, to be implemented on a computer system. Prior to loading in a computer system, the software preferably resides as encoded information on a suitable non-transitory computer-readable tangible medium, such as a magnetic floppy disk, a magnetic tape, CD-ROM, DVD-ROM, solid-state disk, flash memory device, or pre-existing data storage (such as "cloud storage") accessible through an operably coupled network means (such as the Internet).

In certain implementations, the invention includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

Figure 5:
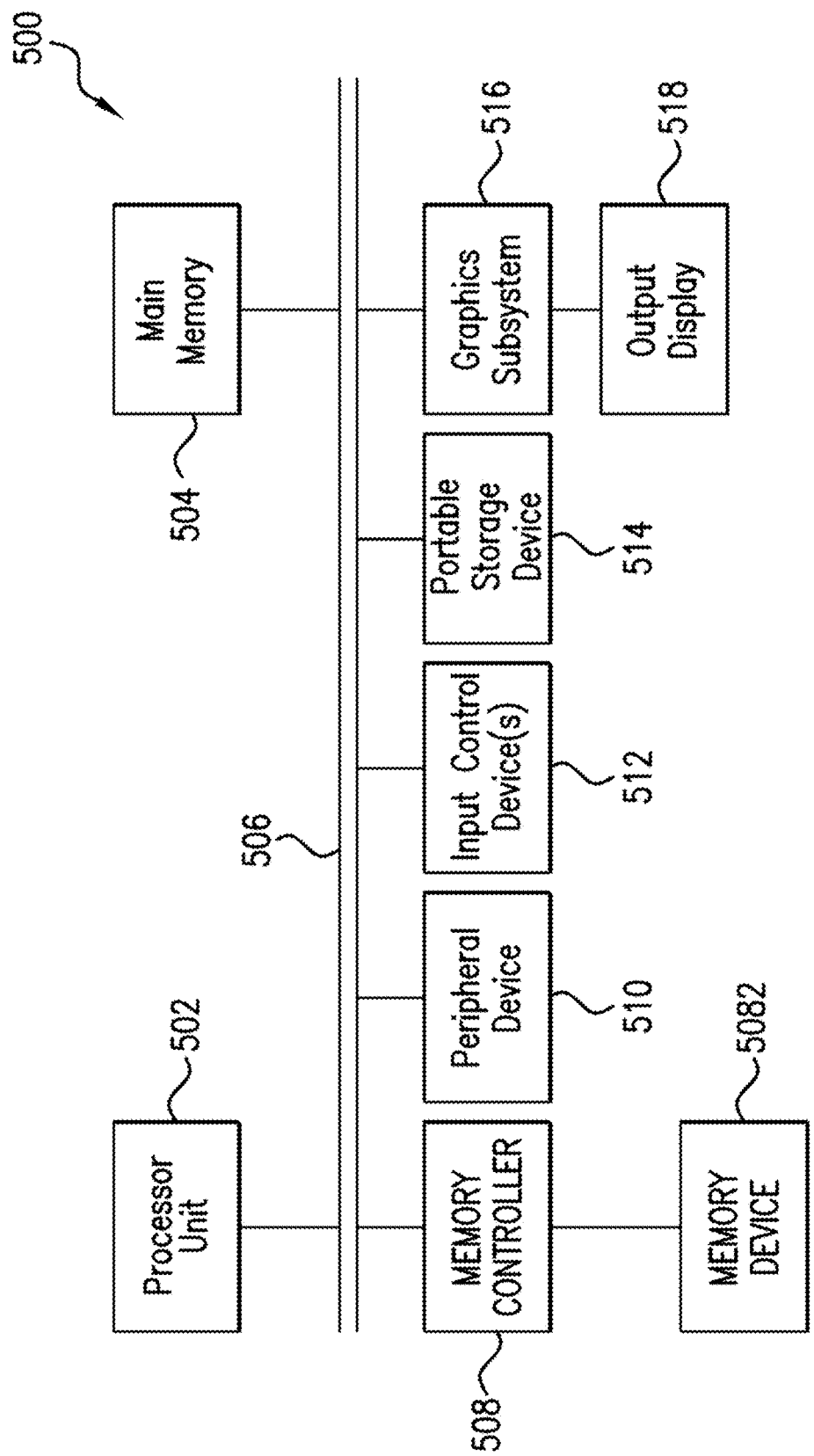
FIG. 5 is a block diagram illustrating an exemplary computer system for programmatic and/or hardware implementation of various embodiments and aspects of the present invention.

As an example, FIG. 5 is a block diagram illustrating an exemplary computer system for programmatic and/or hardware implementation of various aspects of the disclosed system and method. For instance, in various embodiments the system serves as a host for such hardware modules, and/or as a host for executing software modules such as electronic design automation (EDA) tools/simulations/emulation/firmware, in accordance with various configurations of the disclosed system and method.

According to certain embodiments, computer system 500 includes a processor unit 502, a main memory 504, an interconnect bus 506, a memory controller 508 that is coupled to a memory device 5082, peripheral device(s) 510, input control device(s) 512, portable storage medium drive(s) 514, a graphics subsystem 516, and an output display 518. Depending on the particular embodiment and the requirements of the intended application, all or only certain portions of the system components functionally shown may need actual implementation. It is noted, for example, that the embodiment illustrated in FIG. 11 omits the majority of these components.

In various embodiments, processor unit 502 includes a single microprocessor or a plurality of microprocessors for configuring computer system 500 as a multi-processor system. Main memory 504 stores, in part, instructions and data to be executed by processor unit 502. Main memory 504 preferably includes banks of dynamic random access memory (DRAM) as well as high-speed cache memory.

For the purpose of simplicity, the components of computer system 500 are depicted to be interconnected via interconnect bus 506. However, in alternate embodiments, computer system 500 is interconnected through one or more data transport means. For example, in certain embodiments, processor unit 502 and main memory 504 are interconnected via a local microprocessor bus; and memory controller 508, peripheral device(s) 510, portable storage medium drive(s) 514, and graphics subsystem 516 are interconnected via one or more input/output (I/O) buses. Memory device 5082 is preferably implemented as a nonvolatile semiconductor memory for storing data and instructions to be used by processor unit 502. Memory device 5082 preferably stores the software to load it to the main memory 504, but in alternate embodiments is represented in an EDA tool simulation by suitable classes (incorporating data structures and functions operable upon the data structures) or the like as would be known to one of skill in the art.

Portable storage medium drive 514 operates to input and output data and code to and from the computer system 500. In one configuration, the software is stored on such a portable medium, and is input to computer system 500 via portable storage medium drive 514. In various embodiments, peripheral device(s) 510 includes any type of computer support device such as an input/output (I/O) interface, to add additional functionality to computer system 500. For example, in certain embodiments, peripheral device(s) 510 includes a network interface card, to interface computer system 500 to a network. In certain embodiments, peripheral device(s) also includes a memory controller and nonvolatile memory.

Input control device(s) 512 provide a portion of the user interface for a computer system 500 user. In various embodiments, input control device(s) 512 includes an alphanumeric keypad for inputting alphanumeric and other key information; and a cursor control device such as a mouse, a trackpad or stylus; or cursor direction keys.

In order to display textual and graphical information, computer system 500 includes graphics subsystem 514 and output display(s) 518. In various embodiments, output display 518 includes a cathode ray tube (CRT) display, liquid crystal display (LCD), plasma, or active matrix organic light emitting diode (AMOLED) display. Graphics subsystem 516 receives textual and graphical information, and processes the information for output to display 518.

The descriptions above are intended to illustrate possible implementations of the disclosed system and method, and are not restrictive. While this disclosure has been made in connection with specific forms and embodiments thereof, it will be appreciated that various modifications other than those discussed above may be resorted to without departing from the spirit or scope of the disclosed system and method. Such variations, modifications, and alternatives will become apparent to the skilled artisan upon a review of the disclosure. For example, functionally equivalent elements or method operations are substitutable for those specifically shown and described, and certain features are usable independently of other features. Additionally, in various embodiments, all or some of the above embodiments are selectively combined with each other, and particular locations of elements or sequence of method operations are reversed or interposed, all without departing from the spirit or scope of the disclosed system and method as defined in the appended claims. The scope should therefore be determined with reference to the description above and the appended claims, along with their full range of equivalents.

What is claimed is:

1. A system for detecting the presence of animate users within a monitored environment, the system comprising:
    at least one transducer configured to capture vibration signals generated within the monitored environment;
    a capture channel coupled to the transducer, the capture channel receiving and converting the signals captured by the transducer to form a digital stream; and
    a processor configured to generate a user presence indicator for the monitored environment, the processor including:
    a feature extractor executing to detect at least one predetermined signal feature of the digital stream over a predetermined extraction period;
    at least one event classifier executing to generate a series of detection events responsive to the predetermined signal features of the predetermined extraction period;
    at least one event buffer having a predetermined event buffer length defining a buffer period, the event buffer executing to maintain, for a built-in delay period associated with said at least one event buffer, an aggregate count of detection events generated by the event classifier; and
    a status generator executing to generate the user presence indicator according to the aggregate count of detection events, said user presence indicator having an inertia corresponding to said built-in delay period, wherein said status generator maintains the user presence indicator for said built-in delay period;
    wherein the user presence indicator is provided for triggering one or more functions of a response system.

2. The system of claim 1, wherein each detection event is assigned a source weight corresponding to one of a plurality of source categories, the processor includes a plurality of event buffers each maintaining an aggregate count of detection events having a designated source weight, and the status generator generates the user presence indicator according to a combination of weighted aggregate counts of the event buffers.

3. The system of claim 2, wherein the plurality of source categories includes vocal human activity, non-vocal human activity, and non-human activity.

4. The system of claim 1, wherein the feature extractor generates feature vectors representing a plurality of feature values, each feature value representing a measurement of one of the predetermined signal features, the event classifier generating each detection event according to at least one generated feature vector.

5. The system of claim 1, wherein the feature extractor includes a spectrogram-type extractor configured to execute processes including Fourier transformation of time-spaced portions of the digital stream within the predetermined extraction period.

6. The system of claim 1, wherein the event classifier generates the detection events according at least in part to a root-mean-square (RMS) energy value of the digital stream during the extraction period.

7. The system of claim 1, wherein the event classifier generates the detection events according at least in part to a crest value of the digital stream during the extraction period.

8. The system of claim 1, wherein the status generator generates the user presence indicator over a period shorter than the event buffer length.

9. The system of claim 1, wherein each detection event is assigned a weight in the aggregate count according at least in part to an accuracy of the event classifier generating the detection event.

10. The system of claim 1, wherein each detection event is assigned a weight in the aggregate count according at least in part to a predetermined likelihood that the detection event indicates a user presence.

11. The system of claim 1, wherein the user presence indicator includes a binary value.

12. The system of claim 1, wherein the user presence indicator includes a probability value.

13. The system of claim 1, wherein the response system controls lighting within the monitored environment, the response system including one or more light sources, and the triggered functions including active and inactive lighting states.

14. The system of claim 1, wherein the response system includes an alarm system.

* * * * *